(12) United States Patent
Yasuie et al.

(10) Patent No.: US 8,125,895 B2
(45) Date of Patent: Feb. 28, 2012

(54) NETWORK LOOPING DETECTING APPARATUS

(75) Inventors: Takeshi Yasuie, Kawasaki (JP); Yuji Nomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 746 days.

(21) Appl. No.: 11/077,908

(22) Filed: Mar. 11, 2005

(65) Prior Publication Data

US 2006/0013143 A1   Jan. 19, 2006

(30) Foreign Application Priority Data

Jul. 14, 2004   (JP) .................................. 2004-207543

(51) Int. Cl.
*H04L 12/28* (2006.01)
(52) U.S. Cl. .......................... 370/229; 370/351; 709/224
(58) Field of Classification Search .................. 370/216, 370/222, 229–231, 235–236, 238, 351, 254; 709/223–226
See application file for complete search history.

(56) References Cited

U.S. PATENT DOCUMENTS

| | | | | |
|---|---|---|---|---|
| 5,583,848 A * | 12/1996 | Glitho | ............................ | 370/248 |
| 5,793,976 A * | 8/1998 | Chen et al. | ..................... | 709/224 |
| 6,298,456 B1 * | 10/2001 | O'Neil et al. | .................. | 714/48 |
| 6,327,677 B1 * | 12/2001 | Garg et al. | ........................ | 714/37 |
| 6,505,244 B1 * | 1/2003 | Natarajan et al. | ............. | 709/223 |
| 6,526,044 B1 * | 2/2003 | Cookmeyer et al. | .......... | 370/352 |
| 6,826,172 B1 * | 11/2004 | Augart | ........................... | 370/351 |
| 6,826,607 B1 * | 11/2004 | Gelvin et al. | ................. | 709/224 |
| 6,850,524 B1 * | 2/2005 | Troxel et al. | ............. | 370/395.32 |
| 6,879,594 B1 * | 4/2005 | Lee et al. | ...................... | 370/408 |
| 6,952,421 B1 * | 10/2005 | Slater | ............................ | 370/401 |
| 7,110,367 B2 * | 9/2006 | Moriya | ......................... | 370/256 |
| 7,310,356 B2 * | 12/2007 | Abdo et al. | ..................... | 370/522 |
| 7,505,450 B2 * | 3/2009 | Castagnoli | ..................... | 370/350 |
| 2001/0017866 A1 * | 8/2001 | Takada et al. | ................. | 370/535 |
| 2001/0037401 A1 * | 11/2001 | Soumiya et al. | ............. | 709/232 |
| 2002/0059483 A1 * | 5/2002 | Park | ................................ | 710/5 |
| 2003/0026268 A1 * | 2/2003 | Navas | .......................... | 370/400 |
| 2003/0079005 A1 * | 4/2003 | Myers et al. | .................. | 709/223 |
| 2003/0086425 A1 * | 5/2003 | Bearden et al. | ............... | 370/392 |
| 2003/0097438 A1 * | 5/2003 | Bearden et al. | ............... | 709/224 |
| 2004/0264675 A1 * | 12/2004 | Delaney et al. | ............... | 379/229 |

(Continued)

FOREIGN PATENT DOCUMENTS

EP   1052809   * 11/2001

(Continued)

OTHER PUBLICATIONS

Craig Labovitz et al.. Delayed Internet Routing Convergence. ACM SIGCOMM 2000 pp. 175-187.

(Continued)

*Primary Examiner* — Aung S Moe
*Assistant Examiner* — Curtis A Alia
(74) *Attorney, Agent, or Firm* — Fujitsu Patent Center

(57) ABSTRACT

A network looping detecting apparatus has an increased real-time operation capability for network looping detection and also has scalability. The network looping detecting apparatus has a count information acquiring unit for periodically acquiring count information which is counted up when the lifetime of a packet has elapsed, from a network device of a network to be monitored for network looping. The network looping detecting apparatus also has a looping detecting unit for detecting network looping from the count information. Specifically, the network looping detecting apparatus detects network looping based on the fact that when a packet loops due to network looping, the lifetime of the packet elapses, and the count information is counted up.

8 Claims, 21 Drawing Sheets

U.S. PATENT DOCUMENTS

| | | | |
|---|---|---|---|
| 2005/0010685 A1* | 1/2005 | Ramnath et al. | 709/238 |
| 2005/0063311 A1* | 3/2005 | Sekiguchi | 370/241 |
| 2005/0099948 A1* | 5/2005 | Wakumoto et al. | 370/236 |
| 2006/0047807 A1* | 3/2006 | Magnaghi et al. | 709/224 |
| 2006/0159034 A1* | 7/2006 | Talur et al. | 370/254 |

FOREIGN PATENT DOCUMENTS

| | | | |
|---|---|---|---|
| JP | 11-261670 | | 9/1999 |
| JP | 2000-134203 | | 5/2000 |
| JP | 2001136196 A | * | 5/2001 |
| JP | 2003-326173 | | 11/2003 |
| JP | 2005-094468 | | 4/2005 |
| JP | 2005-285040 A | | 10/2005 |
| WO | WO 2006159034 | * | 5/2006 |

OTHER PUBLICATIONS

Urs Hengartner et al. Detection and Analysis of Routing Loops in Packet Traces. IMW (Internet Measurement Workshop) 2002.

"Japanese Office Action", Partial English-language translation, mailed Jul. 14, 2009 from JP Patent Office for corresponding JP App. No. 2004-207543.

* cited by examiner

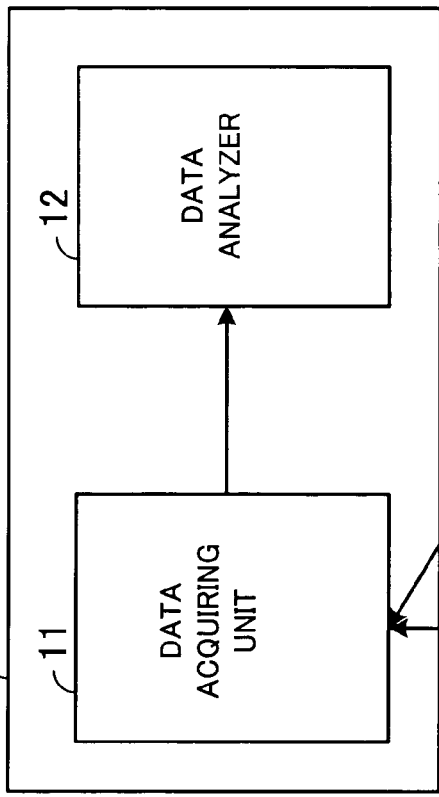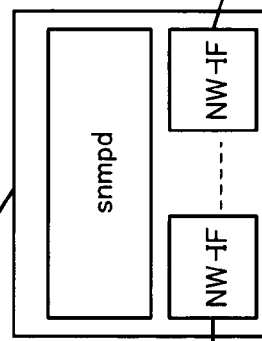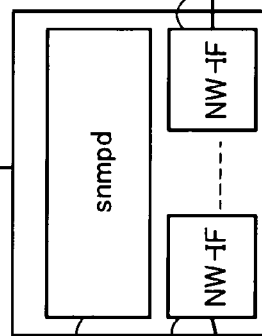
FIG. 2

51 DEVICE ADJACENCY INFORMATION

NETWORK LOOPING DETECTING APPARATUS

CROSS-REFERENCE TO RELATED APPLICATIONS

This application is based upon and claims the benefits of priority from the prior Japanese Patent Application No. 2004-207543, filed on Jul. 14, 2004, the entire contents of which are incorporated herein by reference.

BACKGROUND OF THE INVENTION (1) Field of the Invention

The present invention relates to a network looping detecting apparatus, and more particularly to a network looping detecting apparatus for detecting an instance of network looping.

(2) Description of the Related Art

One of IP network service interruptions is known as network looping which means a communication failure due to packets looping around between a plurality of network devices, e.g., routers, L3 switches, etc. Network looping is caused by faults such as wrong settings in network devices, e.g., Default Route setting mistakes, or hardware failures.

It may be possible to prevent network looping by confirming settings in all network devices of a network that needs to be checked for network looping. However, since uncontrollable settings according to routing protocols including BGP (Border Gateway Protocol), OSPF (Open Shortest Path First), and RIP (Routing Information Protocol) are widely used to cause network looping, it is difficult to prevent network looping simply by confirming network device settings. It has also been desired in the art to detect and eliminate network looping quickly when it occurs, as well as to prevent network looping in advance.

There have been available four methods, to be described below, for detecting network looping. According to the first method, the routing tables of network devices that are involved are checked to detect whether they will cause network looping. According to the second method, a measuring packet is sent to the network to be monitored to estimate whether network looping is occurring. For details, see, for example, "Detection and Analysis of Routing Loops in Packet Traces," IMW (Internet Measurement Workshop) 2002, (Marseille), Nov. 6, 2002. The third method employs a packet capturing device to determine whether a packet is a looping packet or not for detecting network looping. For details, see, for example, "Delayed Internet routing convergence," ACM SIGCOMM 2000, (Stockholm), Aug. 31, 2000. According to the third method, the packet capturing device is used to capture packets at all times and identify, as looping packets, those packets whose invariable parts such as a destination IP address and a source IP address remain unchanged and whose variable parts such as a TTL field and a checksum field according to IPv4 and a HopLimit field according to IPv6 are changed. The third method is based on the fact that the invariable parts of a looping packet are not changed and the variable parts thereof are changed by a recalculation each time the packet passes through a network device.

The fourth method uses an ICMP (Internet Control Message Protocol) TimeExceeded packet as a measuring packet or a packet to be captured for reducing the amount of data to be calculated, thereby reliably detecting network looping. The fourth method is disclosed in Japanese patent application No. 2003-326173.

The first method is disadvantageous in that because it refers to the routing tables of network devices, it lacks scalability and real-time processing.

The second method is problematic in that since a measuring packet is sent to the network to be monitored and an instance of network looping is only estimated from an increased packet loss, a packet delay time, and a tracing route change, the method is not reliable enough.

The third method operates excellently in real-time for detecting network looping, but is not scalable as a packet capturing device needs to be installed in the network to be checked.

The fourth method also lacks scalability because a packet capturing device needs to be installed to capture packets though ICMP TimeExceeded packets are employed.

SUMMARY OF THE INVENTION

It is therefore an object of the present invention to provide a network looping detecting apparatus which has excellent real-time operation capability and scalability.

To achieve the above object, there is provided in accordance with the present invention a network looping detecting apparatus for detecting network looping. The network looping detecting apparatus comprises a count information acquiring unit for periodically acquiring count information which is counted up when the lifetime of a packet has elapsed, from a network device of a network to be monitored for network looping, and a looping detecting unit for detecting network looping from said count information.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 2 is a block diagram showing a system arrangement of a network looping detecting apparatus according to a first embodiment of the present invention;

FIG. 13 is a diagram showing an example of device adjacency information in FIG. 3;

DESCRIPTION OF THE PREFERRED EMBODIMENTS

The principles of the present invention will be described below with reference to the drawings.

Figure 1:
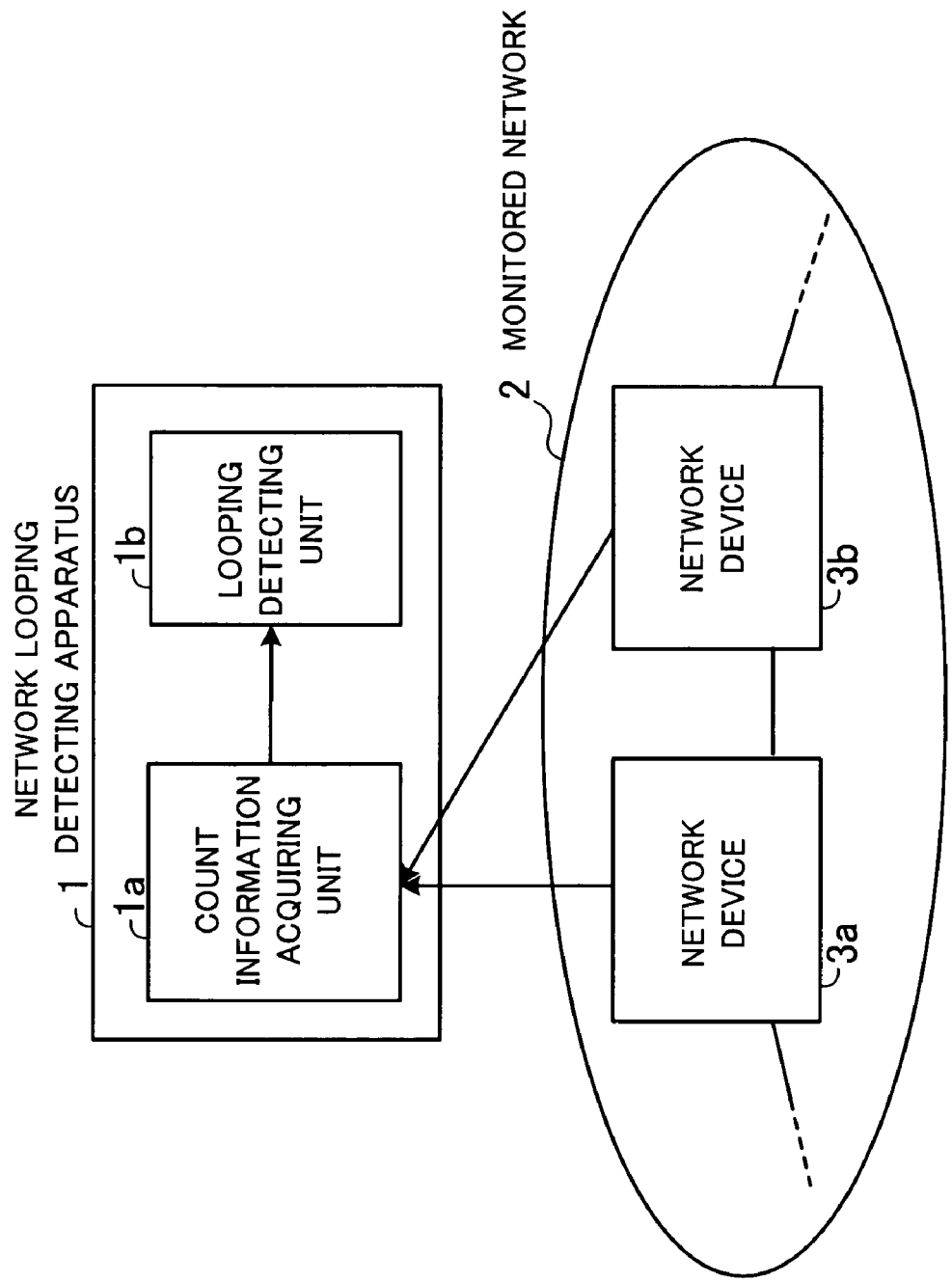
FIG. 1 is a block diagram showing the principles of a network looping detecting apparatus according to the present invention.

FIG. 1 shows the principles of a network looping detecting apparatus 1 according to the present invention.

As shown in FIG. 1, the network looping detecting apparatus 1 is connected to a network 2 to be monitored for network looping. The network 2 comprises a plurality of network devices 3a, 3b, . . . such as routers, L3 switches, etc.

The network looping detecting apparatus 1 has a count information acquiring unit 1a and a looping detecting unit 1b.

The count information acquiring unit 1a periodically acquires count information which is counted up when the lifetime of a packet has elapsed, from the network devices 3a, 3b, . . . of the network 2. The count information is, for example, icmpOutTimeExcds contained in MIB (Management Information Base).

The looping detecting unit 1b detects network looping from the count information acquired by the count information acquiring unit 1a.

The network looping detecting apparatus 1 thus detects network looping based on the fact that when a packet loops due to network looping, the lifetime of the packet elapses, and the count information of the network devices is counted up. Therefore, routing tables do not need to be referred to, and a packet capturing device for capturing packets to detect network looping does not need to be installed, so that the network looping detecting apparatus 1 has improved real-time operation capability and scalability.

A network looping detecting apparatus according to a first embodiment of the present invention will be described below.

FIG. 2 shows in block form a system arrangement of a network looping detecting apparatus 10 according to a first embodiment of the present invention.

The network looping detecting apparatus 10 shown in FIG. 2 is an apparatus for detecting whether network looping is caused or not in a network such as the Internet, for example. The network looping detecting apparatus 10 detects network looping in a certain range of a network as a network to be monitored. A network 21 is a network to be monitored by the network looping detecting apparatus 10.

Monitored devices 31, 32, . . . make up the network 21. The monitored devices 31, 32, . . . are devices for routing packets, and may be routers, L3 switches, etc., for example.

The network looping detecting apparatus 10 detects network looping at an IP level (L3 level), for example. It is assumed hereinafter that the network looping detecting apparatus 10 detects network looping at the IP level and the monitored devices 31, 32 are routers.

The network looping detecting apparatus 10 has a data acquiring unit 11 and a data analyzer 12. The data acquiring unit 11 acquires icmpOutTimeExcds contained in MIB from the monitored devices 31, 32, . . . . The data analyzer 12 analyzes the count of the acquired icmpOutTimeExcds to detect network looping in the monitored network 21.

The monitored device 31 has a program snmpd31a for executing the SNMP (Simple Network Management Protocol). The monitored device 31 also has NW-IFs (NetWork-InterFace) 31b, 31c, . . . for communicating with the other monitored devices 32, . . . . Each of the other monitored devices 32, . . . has a structure identical to the monitored device 31.

When network looping occurs in the monitored network 21, TTL (Time To Live) in the packet header becomes 0 in the monitored devices 31, 32, . . . involved in the network looping. When TTL becomes 0, monitored devices 31, 32, . . . send ICMP TimeExceeded to the packet source, and increments the count of icmpOutTimeExcds held therein.

The count of icmpOutTimeExcds will be described below. When network looping occurs, packet TTL becomes 0 in the monitored devices 31, 32, . . . involved in the network looping. In the monitored devices 31, 32, . . . where packet TTL becomes 0, the count of icmpOutTimeExcds is incremented. Therefore, the count of icmpOutTimeExcds per unit time in the monitored devices 31, 32, . . . involved in the network looping is greater than the count of icmpOutTimeExcds per unit time in monitored devices 31, 32, . . . which are not involved in the network looping.

The data acquiring unit 11 receives icmpOutTimeExcds in MIB from the monitored devices 31, 32, . . . . The data analyzer 12 analyzes the count of icmpOutTimeExcds in MIB to detect the network looping.

Figure 3:
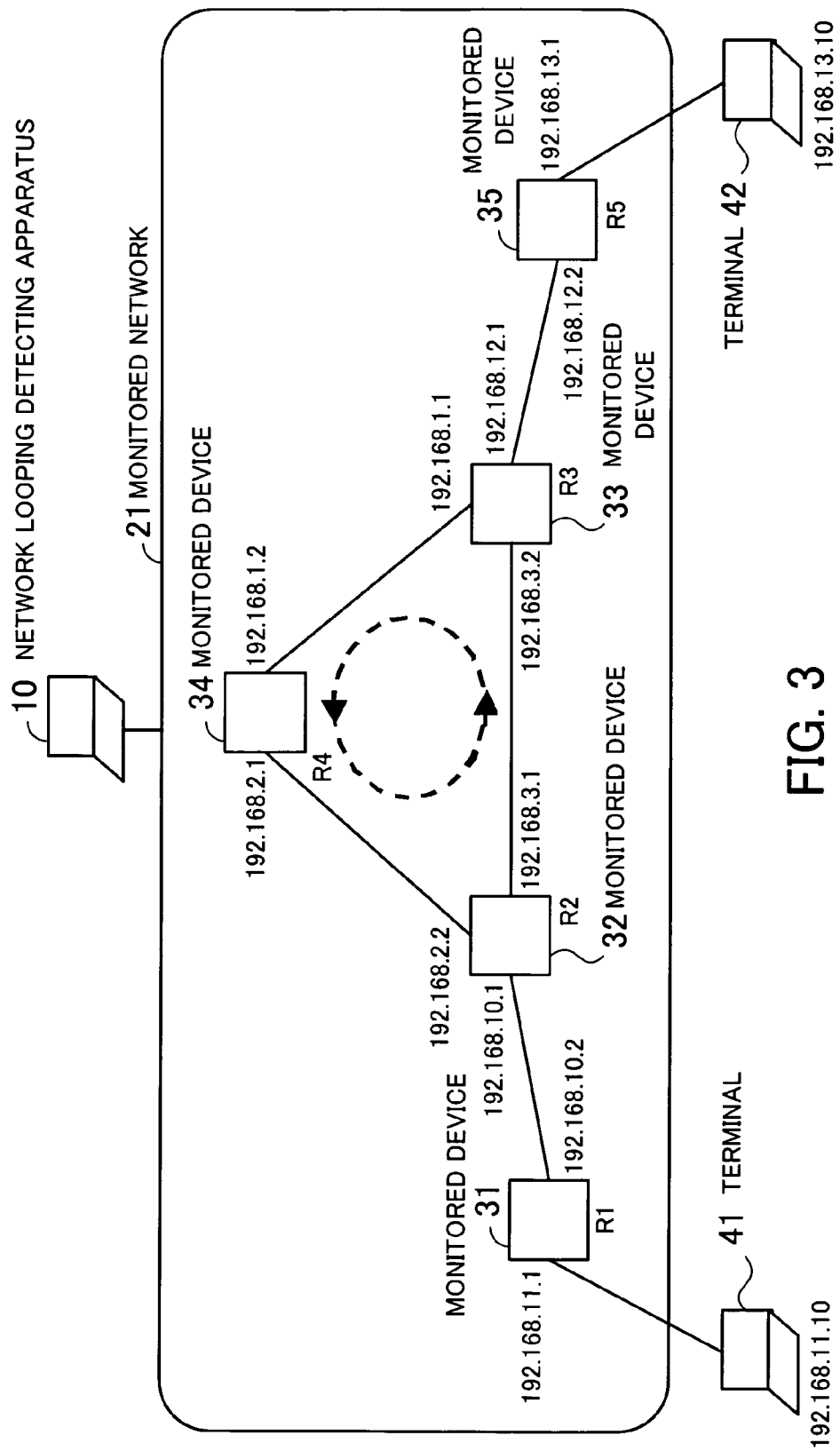
FIG. 3 is a block diagram showing a system arrangement which is illustrative of operation of the network looping detecting apparatus.

FIG. 3 shows in block form a system arrangement which is illustrative of operation of the network looping detecting apparatus.

Those parts shown in FIG. 3 which are identical those shown in FIG. 2 are denoted by identical reference characters, and will not be described in detail below.

Monitored devices 33 through 35 shown in FIG. 3 have the same function as the monitored device 31 shown in FIG. 2. The monitored devices 31 through 35 have ports having respective IP addresses shown in FIG. 3. The monitored devices 31 through 35 also have monitored addresses R1 through R5 which are inherent addresses owned by the respective monitored devices 31 through 35.

A terminal 41 is connected to the monitored device 31, and a terminal 42 is connected to the monitored device 35. The terminals 41, 42 can communicate with each other through the monitored network 21.

A general processing sequence of the network looping detecting apparatus 10 shown in FIGS. 2 and 3 will be described below.

Figure 4:
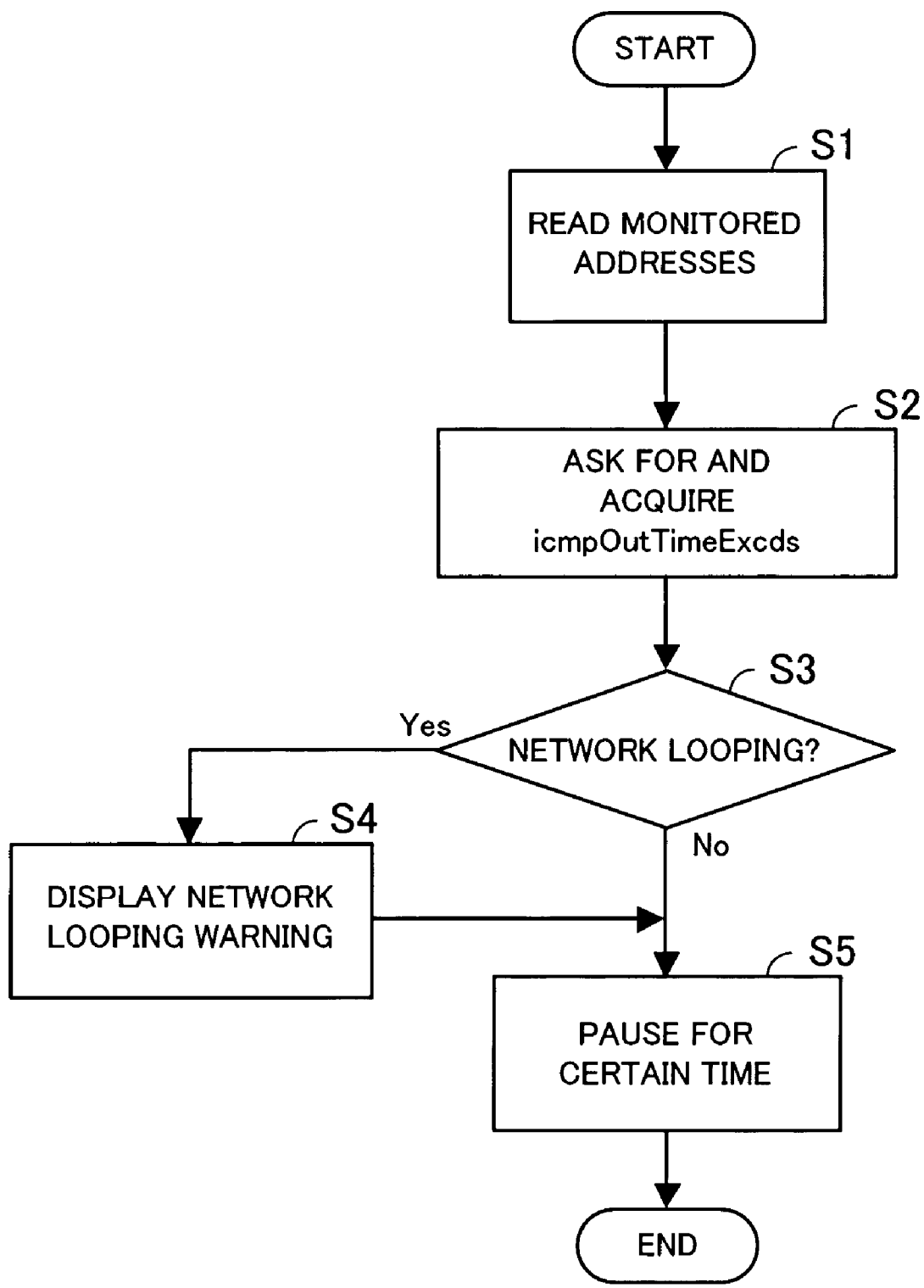
FIG. 4 is a flowchart of a general processing sequence of the network looping detecting apparatus.

FIG. 4 is a flowchart of a general processing sequence of the network looping detecting apparatus 10.

In step S1, the network looping detecting apparatus 10 reads the monitored addresses of the monitored devices 31 through 35 that are monitored for network looping. The monitored addresses are entered, for example, by the administrator of the network looping detecting apparatus 10.

In step S2, the network looping detecting apparatus 10 asks for and acquires icmpOutTimeExcds in MIB from the monitored addresses.

In step S3, the network looping detecting apparatus 10 analyzes the acquired counts of icmpOutTimeExcds from the monitored devices 31 through 35 to determine whether network looping occurs in the monitored network 21 or not. If it is judged that network looping occurs in the monitored network 21, then control goes from step S3 to step S4. If it is judged that no network looping occurs in the monitored network 21, then control goes from step S3 to step S5.

In step S4, the network looping detecting apparatus 10 displays a network looping warning on a display unit thereof, letting the administrator of the network looping detecting apparatus 10 know the network looping.

In step S5, the network looping detecting apparatus 10 pauses for a certain time, e.g., five minutes.

When the processing sequence shown in FIG. 4 is ended, the network looping detecting apparatus 10 executes again the steps of the processing sequence from step S2.

A processing sequence of the data acquiring unit 11 of the network looping detecting apparatus 10 will be described below.

Figure 5:
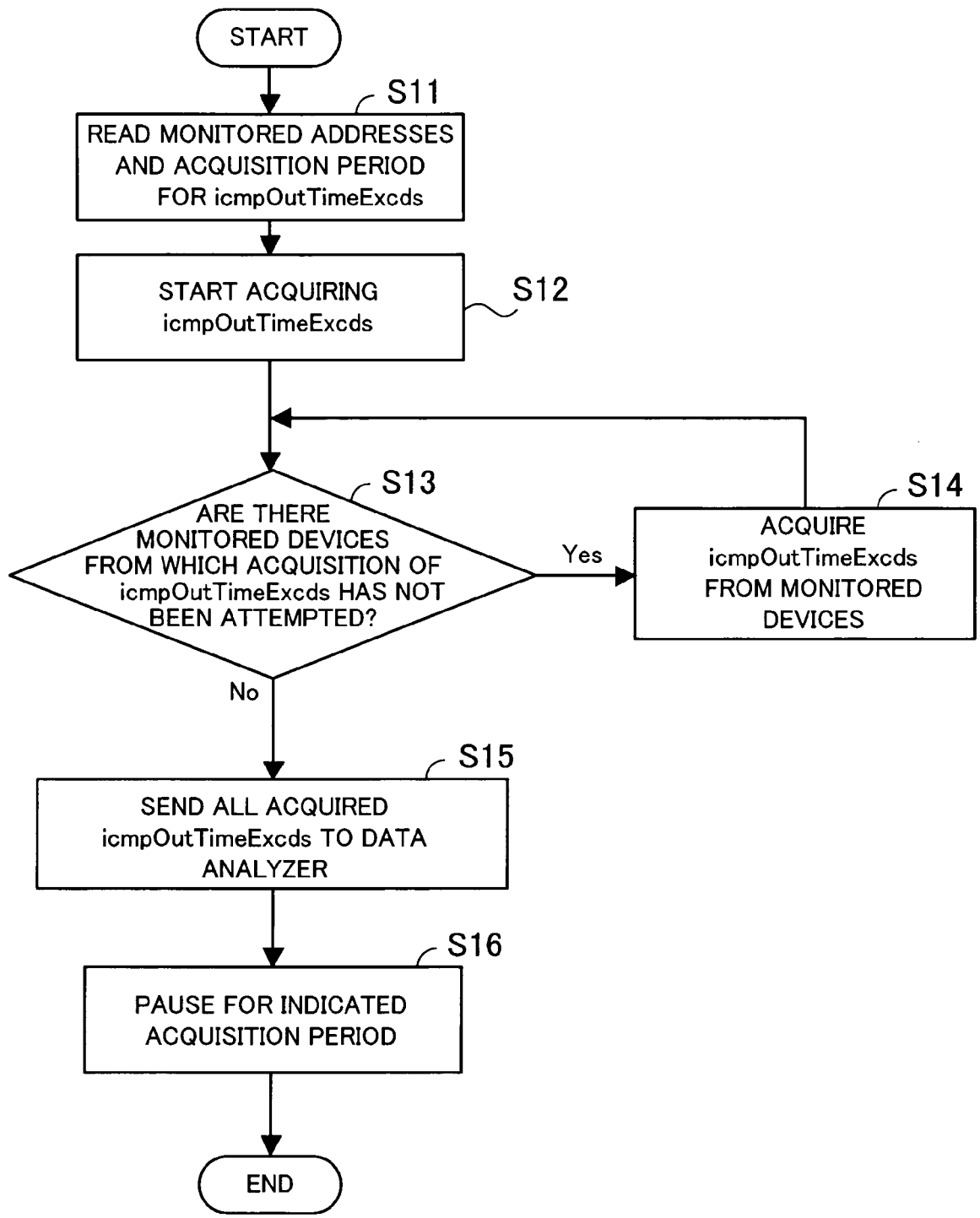
FIG. 5 is a flowchart of a processing sequence of a data acquiring unit.

FIG. 5 shows the processing sequence of the data acquiring unit 11.

In step S11, the data acquiring unit 11 reads monitored addresses and an acquisition period for acquiring icmpOutTimeExcds in MIB. The monitored addresses and the acquisition period for acquiring icmpOutTimeExcds are entered by the administrator of the network looping detecting apparatus 10, for example.

In step S12, the data acquiring unit 11 starts acquiring icmpOutTimeExcds according to the monitored addresses.

In step S13, the data acquiring unit 11 determines whether there are monitored devices 31 through 35 (monitored addresses) from which the acquisition of icmpOutTimeExcds has not been attempted. If there are monitored devices 31 through 35 from which the acquisition of icmpOutTimeExcds has not been attempted, control goes to step S14. If there are not monitored devices 31 through 35 from which the acquisition of icmpOutTimeExcds has not been attempted, control goes to step S15.

In step S14, the data acquiring unit 11 acquires icmpOutTimeExcds from the monitored devices 31 through 35 (monitored addresses) from which the acquisition of icmpOutTimeExcds has not been attempted.

In step S15, the data acquiring unit 11 gives all the acquired icmpOutTimeExcds of the monitored devices 31 through 35 to the data analyzer 12.

In step S16, the data acquiring unit 11 pauses for the acquisition period indicated in step S11.

When the processing of step S16 is ended, the data acquiring unit 11 executes again the steps of the processing sequence from step S12.

A process of determining network looping will be described below.

Figure 6:
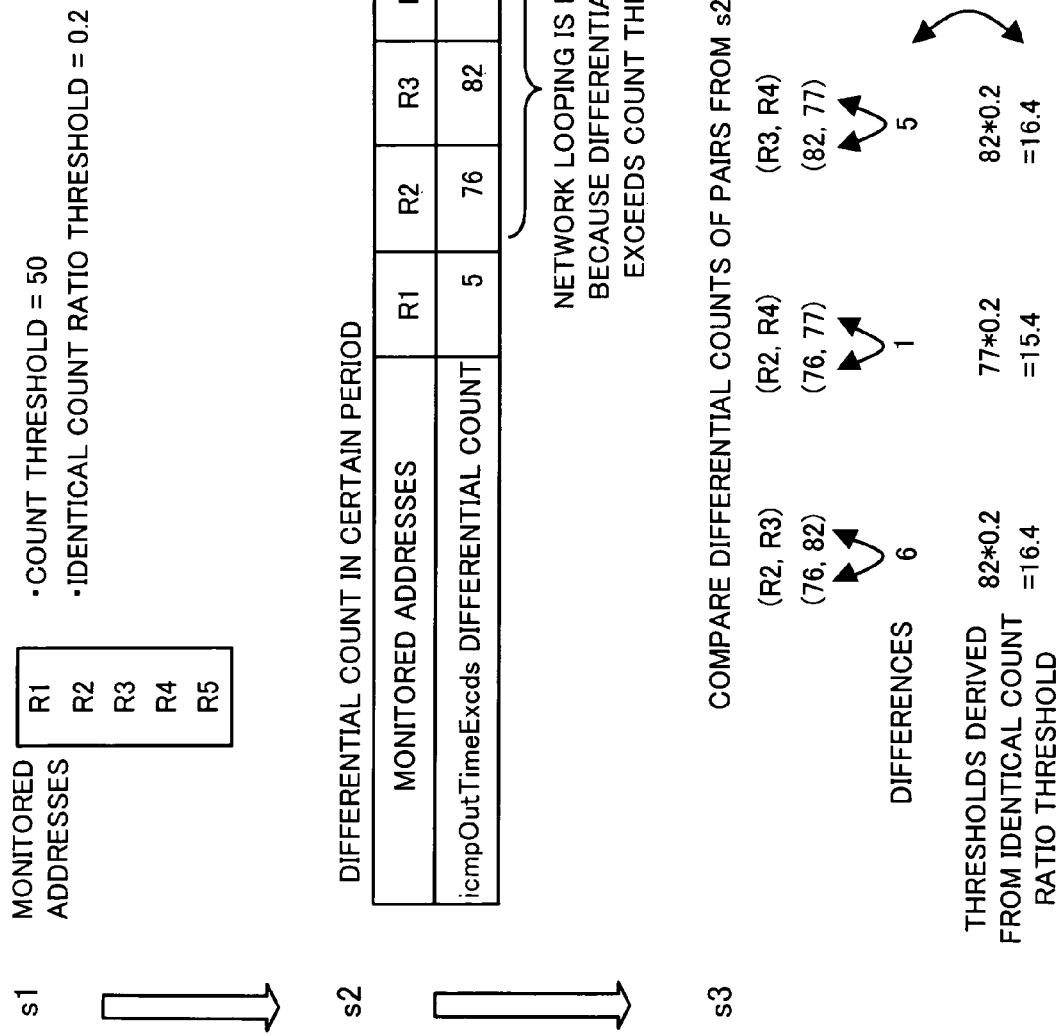
FIG. 6 is a diagram illustrative of operation of the network looping detecting apparatus according to the first embodiment.

FIG. 6 is illustrative of operation of the network looping detecting apparatus 10 according to the first embodiment.

In FIG. 6, operation of the network looping detecting apparatus 10 shown in FIGS. 2 and 3 will be described separately in steps s1 through s3.

As indicated in step s1, addresses R1 through R5 to be monitored for network looping are set in the network looping detecting apparatus 10. The monitored addresses R1 through R5 represent the respective monitored addresses of the monitored devices 31 through 35.

Furthermore, a count threshold for determining network looping is also set in the network looping detecting apparatus 10. Specifically, the count threshold is set to 50.

In addition, an identical count ratio threshold for determining network looping more accurately is also set in the network looping detecting apparatus 10. Specifically, the identical count ratio threshold is set to 0.2. The monitored addresses, the count threshold, and the identical count ratio threshold are entered by the administrator of the network looping detecting apparatus 10, for example.

As indicated in step s2, the network looping detecting apparatus 10 determines the difference (differential count) between the count of icmpOutTimeExcds acquired in the set period and the count of icmpOutTimeExcds acquired previously for each of the monitored addresses. For example, the differential count for the monitored address R1 is 5, and the differential count for the monitored address R2 is 76.

The network looping detecting apparatus 10 detects differential counts in excess of the set count thresholds. In other words, the network looping detecting apparatus 10 detects those monitored devices 31 through 35 which have sent icmpOutTimeExcds in excess of a certain differential count as devices involved in network looping. In the illustrated example, the differential counts for the monitored addresses R2 through R4 are in excess of 50. Therefore, the network looping detecting apparatus 10 detects the monitored devices 32 through 35 as devices involved in network looping.

If packets transmitted from many sources are looping due to network looping and the number of looping packets is very large, then the counts per acquisition periods of monitored devices involved in the network looping are considered to be about the same probabilistically because of the law of great numbers. For example, if three routers are involved in network looping, then the count of each router is close to one-third of the total looping count.

As indicated in step s3, the network looping detecting apparatus 10 pairs the monitored addresses whose differential counts have exceeded the count threshold, and then calculates differences between the differential counts of the monitored address pairs. The network looping detecting apparatus 10 multiplies the greater one of the differential counts of each monitored address pair by the identical count ratio threshold. If the difference between the differential counts of each monitored address pair is smaller than the product which serves as a threshold, then the paired monitored addresses are detected as being involved in network looping.

Stated otherwise, paired monitored addresses having similar differential counts are detected as being highly possibly involved in network looping.

Though network looping can be detected in step s2, it can be detected more accurately in step s3.

The processing of step s2 will be described in greater detail below with reference to FIG. 7.

Figure 7:
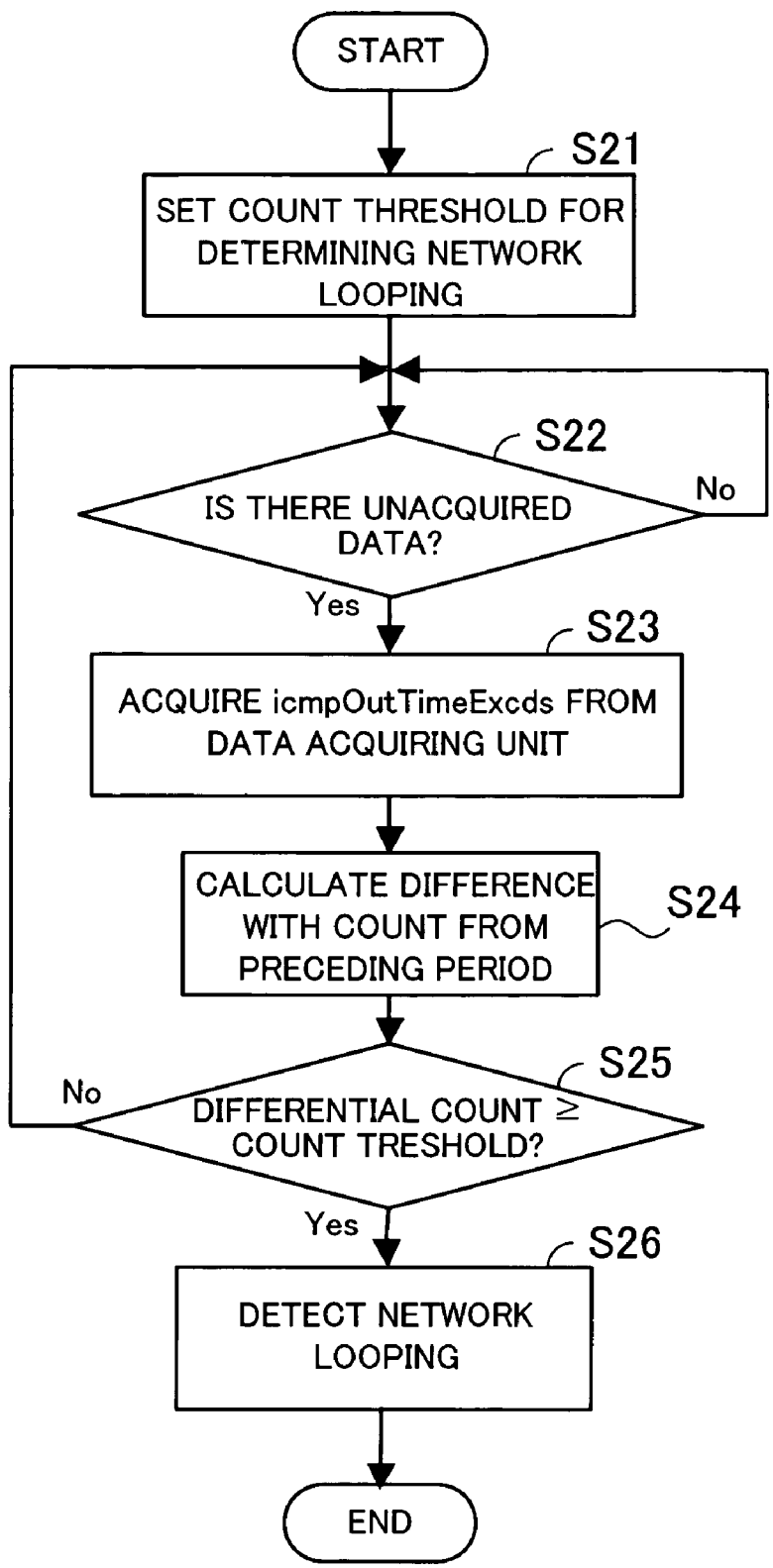
FIG. 7 is a flowchart of a processing sequence of the network looping detecting apparatus according to the first embodiment.

FIG. 7 shows a processing sequence of the network looping detecting apparatus 10 according to the first embodiment.

In step S21, a count threshold for determining network looping is set in the data analyzer 12 of the network looping detecting apparatus 10.

In step S22, the data analyzer 12 determines whether there are data (icmpOutTimeExcds) not acquired from the data acquiring unit 11 or not. If there are unacquired data, then control goes to step S23. If there are no unacquired data, then the processing of step S22 is repeated.

In step S23, the data analyzer 12 acquires icmpOutTimeExcds from the data acquiring unit 11.

In step S24, the data analyzer 12 calculates the difference (differential count) between the count of icmpOutTimeExcds of each monitored address and the count of icmpOutTimeExcds in the preceding period.

In step S25, the data analyzer 12 compares the differential count with the count threshold. If the differential count is equal to or greater than the count threshold, then control goes to step S26. If the differential count is smaller than the count threshold, then control goes back to step S22.

In step S26, the data analyzer 12 detects network looping in the monitored network 21.

When the processing of step S26 is ended, the data analyzer 12 executes again the steps of the processing sequence from step S22.

The processing of step s3 will be described in greater detail below with reference to FIG. 8.

Figure 8:
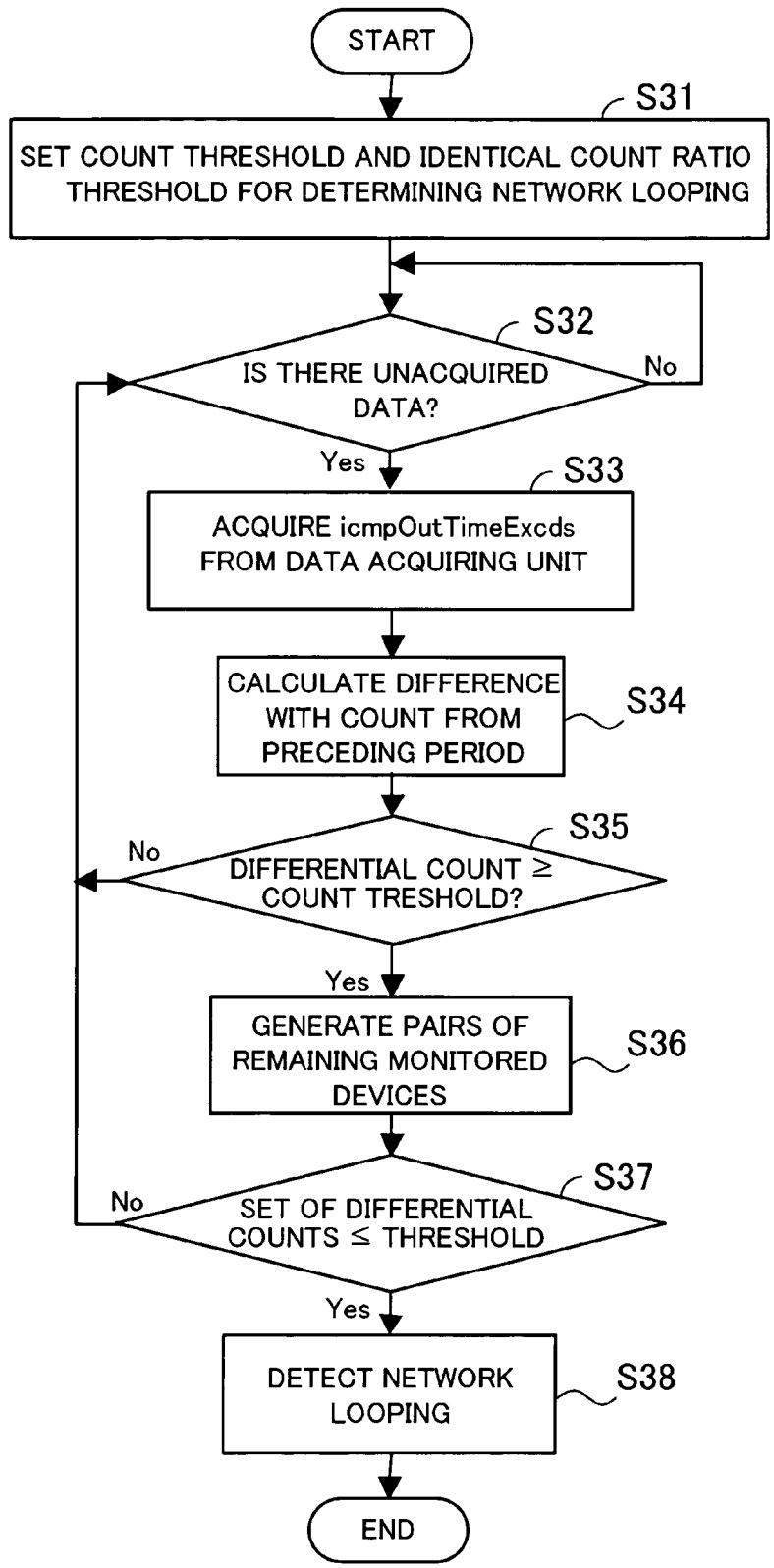
FIG. 8 is a flowchart of another processing sequence of the network looping detecting apparatus according to the first embodiment.

FIG. 8 shows another processing sequence of the network looping detecting apparatus 10 according to the first embodiment.

In step S31, a count threshold and an identical count ratio threshold for determining network looping is set in the data analyzer 12 of the network looping detecting apparatus 10.

In step S32, the data analyzer 12 determines whether there are data (icmpOutTimeExcds) not acquired from the data acquiring unit 11 or not. If there are unacquired data, then control goes to step S33. If there are no unacquired data, then the processing of step S32 is repeated.

In step S33, the data analyzer 12 acquires icmpOutTimeExcds from the data acquiring unit 11.

In step S34, the data analyzer 12 calculates the difference (differential count) between the count of icmpOutTimeExcds of each monitored address and the count of icmpOutTimeExcds in the preceding period.

In step S35, the data analyzer 12 compares the differential count with the count threshold. If the differential count is equal to or greater than the count threshold, then control goes to step S36. If the differential count is smaller than the count threshold, then control goes back to step S32.

In step S36, the data analyzer 12 generates all pairs of the remaining monitored devices (monitored addresses) from step S35.

In step S37, the data analyzer 12 compares the set of the differential counts (the difference between the differential counts of each monitored device pair) with a threshold (the product of the greater one of the differential counts of each monitored device pair and the identical count ratio threshold) with each other. If the set of the differential counts is equal to or smaller than the threshold, then control goes to step S38. If the set of the differential counts is greater than the threshold, then control goes back to step S32.

In step S38, the data analyzer 12 detects network looping in the monitored network 21.

When the processing of step S38 is ended, the data analyzer 12 executes again the steps of the processing sequence from step S32.

As described above, the counts of icmpOutTimeExcds are periodically acquired from the monitored addresses, and network looping is detected from the differential counts of icmpOutTimeExcds. It is thus possible to detect an instance of network looping and also a group of devices involved in network looping, using only icmpOutTimeExcds in MIB, without the need for capturing packets. Since network looping is determined by acquiring MIB without using routing tables and capturing packets, the network looping detecting apparatus has excellent scalability, may be located anywhere for network looping detection insofar as it can access the monitored devices, and can remotely monitor the monitored devices for network looping.

Paired monitored devices having similar differential counts of icmpOutTimeExcds are determined as being highly possibly involved in network looping. In this manner, network looping can be detected highly accurately by detecting such paired monitored devices.

A network looping detecting apparatus according to a second embodiment of the present invention will be described below.

According to the second embodiment, the counts of icmpOutTimeExcds are periodically acquired from the monitored addresses, and differential counts of icmpOutTimeExcds are calculated. If a predetermined number of successive differential counts exceed a predetermined count threshold, then network looping is detected.

The network looping detecting apparatus according to the second embodiment is of an arrangement similar to the network looping detecting apparatus 10 according to the first embodiment shown in FIG. 2, but differs therefrom as to the function of the data analyzer 12. The network looping detecting apparatus according to the second embodiment will be described below based on the system arrangement shown in FIGS. 2 and 3.

Figure 9:
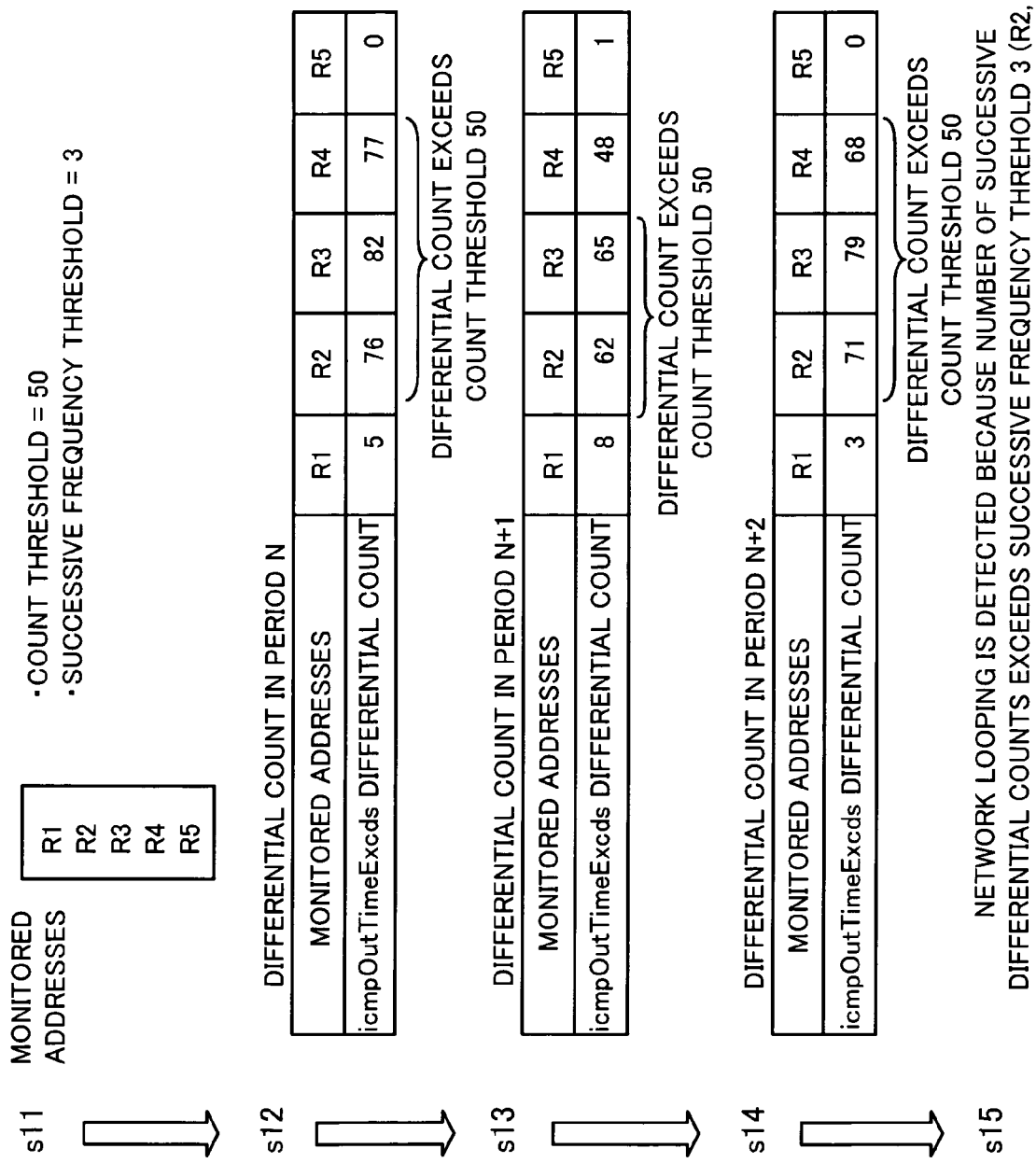
FIG. 9 is a diagram illustrative of operation of a network looping detecting apparatus according to a second embodiment of the present invention.

FIG. 9 is illustrative of operation of the network looping detecting apparatus 10 according to the second embodiment of the present invention.

In FIG. 9, operation of the network looping detecting apparatus 10 shown in FIGS. 2 and 3 will be described separately in steps s11 through s15.

As indicated in step s11, addresses R1 through R5 to be monitored for network looping are set in the network looping detecting apparatus 10. Furthermore, a count threshold and a successive frequency threshold are also set in the network looping detecting apparatus 10. Specifically, the count threshold is set to 50, and the successive frequency threshold is set to 3. The monitored addresses, the count threshold, and the successive frequency threshold are entered by the administrator of the network looping detecting apparatus 10, for example.

As indicated in step s12, the network looping detecting apparatus 10 acquires the counts of icmpOutTimeExcds from the monitored addresses in a predetermined period, and calculates the differences (differential counts) between the acquired counts and preceding counts. In FIG. 9, the network looping detecting apparatus 10 calculates the differential counts in a period N.

As indicated in step s13, the network looping detecting apparatus 10 acquires the counts of icmpOutTimeExcds from the monitored addresses in another predetermined period, and calculates the differences (differential counts) between the acquired counts and preceding counts. In FIG. 9, the network looping detecting apparatus 10 calculates the differential counts in a period N+1.

As indicated in step s14, the network looping detecting apparatus 10 acquires the counts of icmpOutTimeExcds from the monitored addresses in still another predetermined period, and calculates the differences (differential counts)

between the acquired counts and preceding counts. In FIG. 9, the network looping detecting apparatus 10 calculates the differential counts in a period N+2.

As indicated in step s15, the network looping detecting apparatus 10 determines whether or not successive differential counts are equal to or greater than the count threshold, and determines whether or not the number of successive differential counts is equal to or greater than the successive frequency threshold. If the number of successive differential counts is equal to or greater than the successive frequency threshold, then the network looping detecting apparatus 10 detects network looping in the monitored network 21.

In the example shown in FIG. 9, the differential counts of the monitored addresses R2, R3 are in excess of the count threshold of 50 as many times as the successive frequency threshold of 3. The network looping detecting apparatus 10 detects network looping in the monitored network 21, and determines the monitored devices 32, 33 having the respective monitored addresses R2, R3 as being involved in the network looping.

As described above, if successive differential counts are equal to or greater than the count threshold as many times as the predetermined successive frequency threshold, then the network looping detecting apparatus 10 detects network looping in the monitored network 21. Therefore, the network looping detecting apparatus 10 can detect network looping accurately.

The counts of icmpOutTimeExcds and the differential counts thereof in several periods (three periods in FIG. 9) are stored in a memory such as a RAM (Random Access Memory), for example.

A process of detecting network looping when a differential count is equal to or greater than the count threshold as many times as the successive frequency threshold will be described below with reference to FIG. 10.

Figure 10:
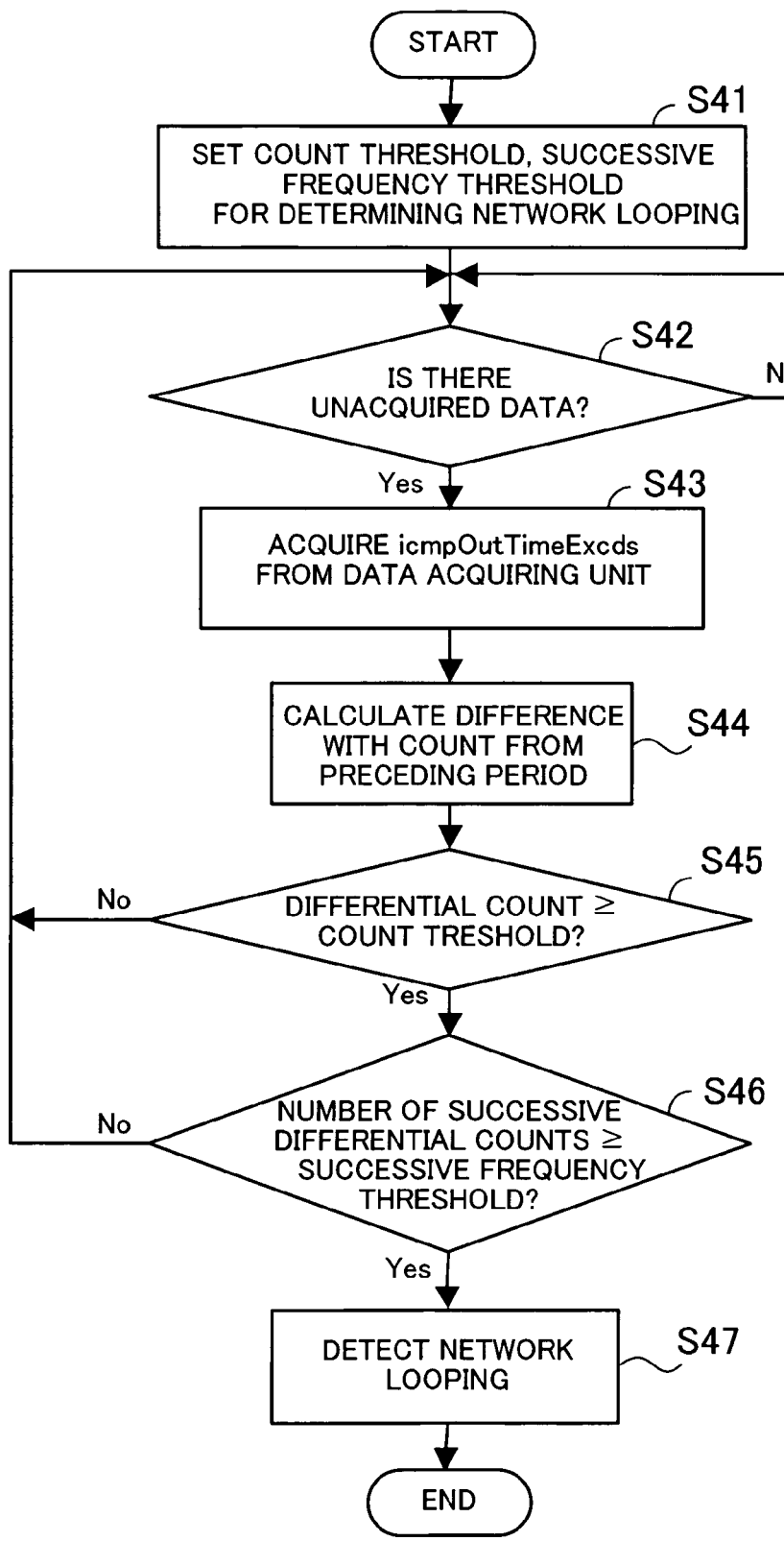
FIG. 10 is a flowchart of a processing sequence of the network looping detecting apparatus according to the second embodiment.

FIG. 10 shows a processing sequence of the network looping detecting apparatus 10 according to the second embodiment.

In step S41, a count threshold and a successive frequency threshold for determining network looping are set in the data analyzer 12 of the network looping detecting apparatus 10.

In step S42, the data analyzer 12 determines whether there are data (icmpOutTimeExcds) not acquired from the data acquiring unit 11 or not. If there are unacquired data, then control goes to step S43. If there are no unacquired data, then the processing of step S42 is repeated.

In step S43, the data analyzer 12 acquires icmpOutTimeExcds from the data acquiring unit 11.

In step S44, the data analyzer 12 calculates the difference (differential count) between the count of icmpOutTimeExcds of each monitored address and the count of icmpOutTimeExcds in the preceding period.

In step S45, the data analyzer 12 compares the differential count with the count threshold. If the differential count is equal to or greater than the count threshold, then control goes to step S46. If the differential count is smaller than the count threshold, then control goes back to step S42.

In step S46, the data analyzer 12 determines whether or not the number of successive differential counts that are equal to or greater than the count threshold is equal to or greater than the successive frequency threshold. If the number of successive differential counts that are equal to or greater than the count threshold is equal to or greater than the successive frequency threshold, then control goes to step S47. If the number of successive differential counts that are equal to or greater than the count threshold is smaller than the successive frequency threshold, then control goes back to step S42.

In step S47, the data analyzer 12 detects network looping in the monitored network 21.

When the processing of step S47 is ended, the data analyzer 12 executes again the steps of the processing sequence from step S42.

As described above, if successive differential counts are equal to or greater than the count threshold, and the number of such successive differential counts is equal to or greater than the successive frequency threshold, then network looping is detected. Consequently, network looping can be detected more accurately.

A network looping detecting apparatus according to a third embodiment of the present invention will be described below.

According to the third embodiment, the counts of icmpOutTimeExcds are periodically acquired from the monitored addresses, and differential counts of icmpOutTimeExcds over several periods are calculated and stored. If differential counts exceed a count threshold, then the monitored devices whose differential counts have exceeded the count threshold are paired. A correlated value of past differential counts of the paired monitored devices is calculated. If the correlated value is equal to or greater than a predetermined correlative threshold, then network looping is detected.

The network looping detecting apparatus according to the third embodiment is of an arrangement similar to the network looping detecting apparatus 10 according to the first embodiment shown in FIG. 2, but differs therefrom as to the function of the data analyzer 12. The network looping detecting apparatus according to the third embodiment will be described below based on the system arrangement shown in FIGS. 2 and 3.

Figure 11:
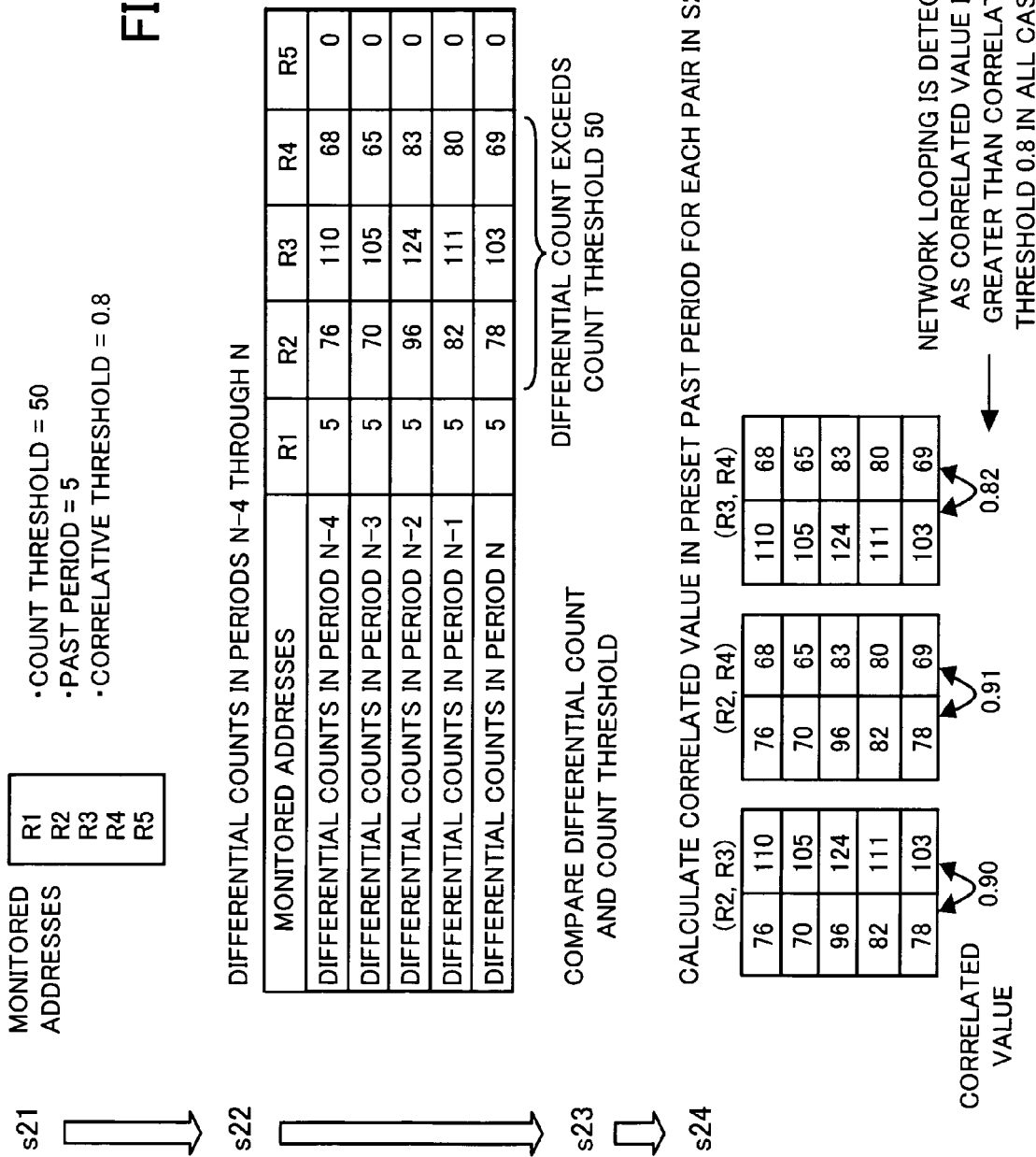
FIG. 11 is a diagram illustrative of operation of a network looping detecting apparatus according to a third embodiment of the present invention.

FIG. 11 is illustrative of operation of the network looping detecting apparatus 10 according to the third embodiment of the present invention.

In FIG. 11, operation of the network looping detecting apparatus 10 shown in FIGS. 2 and 3 will be described separately in steps s21 through s24.

As indicated in step s21, addresses R1 through R5 to be monitored for network looping are set in the network looping detecting apparatus 10. A count threshold, a past period, and a correlative threshold for determining network looping are also set in the network looping detecting apparatus 10. Specifically, the count threshold is set to 50, the past period is set to 5, and the correlative threshold is set to 0.8. The monitored addresses, the count threshold, the past period, and the correlative threshold are entered, for example, by the administrator of the network looping detecting apparatus 10.

As indicated in step s22, the network looping detecting apparatus 10 acquires the counts of icmpOutTimeExcds from the monitored addresses in a predetermined period, and calculates the differences (differential counts) between the acquired counts and preceding counts. For comparing the differential counts for a correlation, the network looping detecting apparatus 10 holds differential counts for five past cycles set in the past period.

As indicated in step s23, the network looping detecting apparatus 10 compares the presently acquired counts of icmpOutTimeExcds with the count threshold. In FIG. 11, the differential counts of the monitored addresses R2 through R4 are in excess of the count threshold of 50.

As indicated in step s24, the network looping detecting apparatus 10 pairs the monitored addresses whose differential counts are equal to or greater than the count threshold. Then, the network looping detecting apparatus 10 calculates a correlated value in the past period of the differential counts of the paired monitored devices. If the correlated value is equal to or greater than the correlative threshold, then the network looping detecting apparatus 10 detects network looping. Specifically, if the differential counts of the paired monitored addresses change correlatively, then the network looping detecting apparatus 10 detects network looping between the paired monitored addresses. The correlated value is determined by the following equation:

$$r_{xy} = \frac{\sum_{i=1}^{k}(xi-\bar{x})(yi-\bar{y})}{\sqrt{\sum_{i=1}^{k}(xi-\bar{x})^2}\sqrt{\sum_{i=1}^{k}(yi-\bar{y})^2}}$$

where xi, yi represent differential counts, and
$\bar{x}$, $\bar{y}$ represent averages of differential counts.

A process of detecting network looping based on a correlation between differential counts in the past will be described below with reference to FIG. 12.

Figure 12:
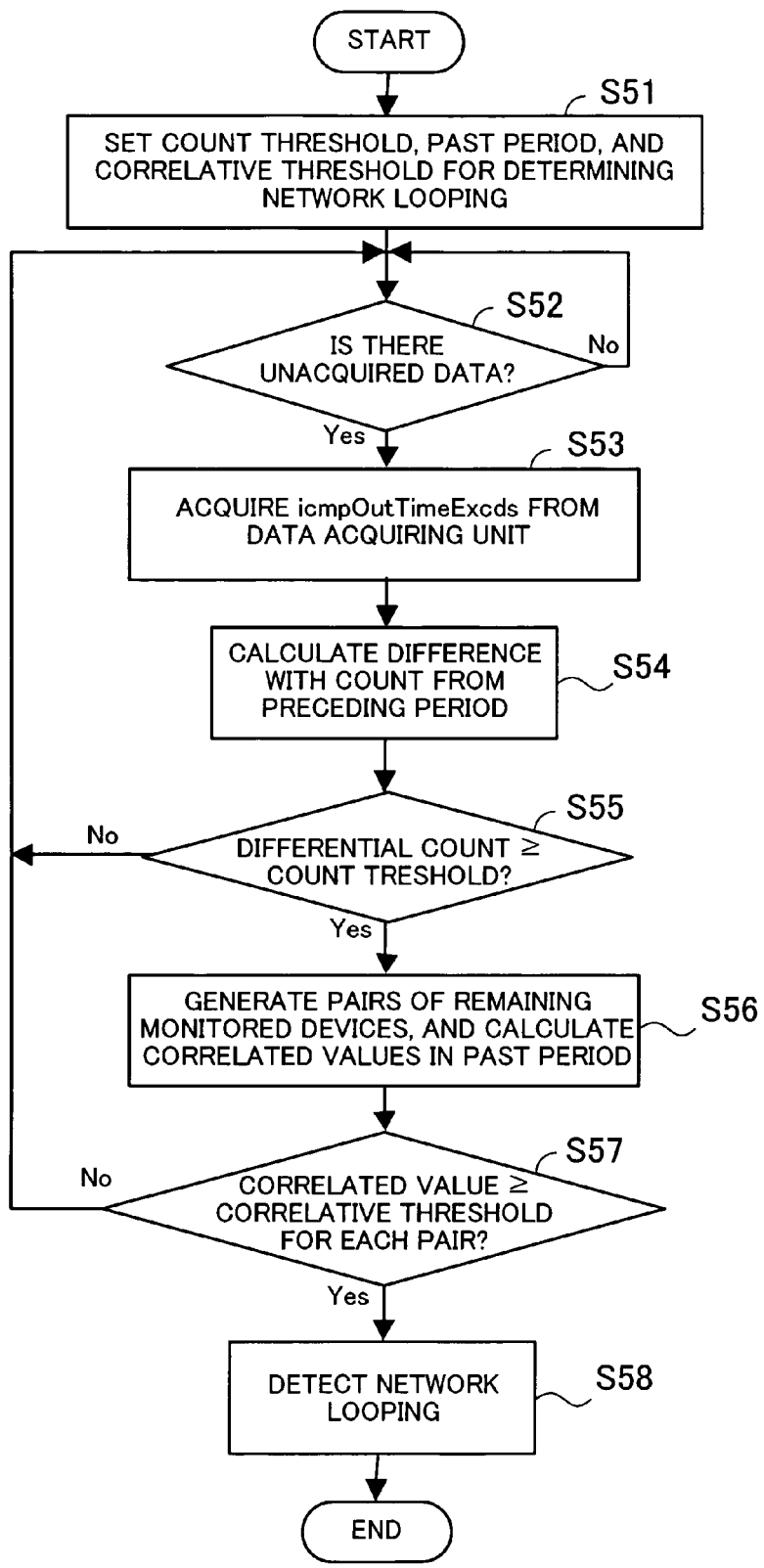
FIG. 12 is a flowchart of a processing sequence of the network looping detecting apparatus according to the third embodiment.

FIG. 12 shows a processing sequence of the network looping detecting apparatus 10 according to the third embodiment.

In step S51, a count threshold, a past period, and a correlative threshold for determining network looping are set in the data analyzer 12 of the network looping detecting apparatus 10.

In step S52, the data analyzer 12 determines whether there are data (icmpOutTimeExcds) not acquired from the data acquiring unit 11 or not. If there are unacquired data, then control goes to step S53. If there are no unacquired data, then the processing of step S52 is repeated.

In step S53, the data analyzer 12 acquires icmpOutTimeExcds from the data acquiring unit 11.

In step S54, the data analyzer 12 calculates the difference (differential count) between the count of icmpOutTimeExcds of each monitored address and the count of icmpOutTimeExcds in the preceding period.

In step S55, the data analyzer 12 compares the differential count with the count threshold. If the differential count is equal to or greater than the count threshold, then control goes to step S56. If the differential count is smaller than the count threshold, then control goes back to step S52.

In step S56, the data analyzer 12 generates all pairs of the remaining monitored devices from step S55. Then, the data analyzer 12 calculates a correlated value of the differential counts in the past period for each pair of monitored devices.

In step S57, the data analyzer 12 determines whether or not the correlated value calculated in step S56 for each pair of monitored devices is equal to or greater than the correlative threshold. If the correlated value is equal to or greater than the correlative threshold, then control goes to step S58. If the correlated value is smaller than the correlative threshold, then control goes back to step S52.

In step S58, the data analyzer 12 detects network looping in the monitored network 21.

When the processing of step S58 is ended, the data analyzer 12 executes again the steps of the processing sequence from step S52.

As described above, the monitored devices are paired, and a correlated value of the differential counts in the past of the monitored device in each pair is calculated. If the correlated value is equal to or greater than the correlative threshold, then network looping is detected. Consequently, network looping can be detected more accurately.

A network looping detecting apparatus according to a fourth embodiment of the present invention will be described below.

According to the fourth embodiment, the network looping detecting apparatus 10 has device adjacency information indicative of how monitored devices are connected. The network looping detecting apparatus 10 detects monitored devices involved in network looping, and generates all pairs of the detected monitored devices. The network looping detecting apparatus 10 then refers to the device adjacency information and determining the monitored devices in each pair are connected adjacent to each other or not. If it is judged that the monitored devices in each pair are connected adjacent to each other, then the network looping detecting apparatus 10 finally detects network looping.

The network looping detecting apparatus according to the fourth embodiment is of an arrangement similar to the network looping detecting apparatus 10 according to the first embodiment shown in FIG. 2, but differs therefrom as to the function of the data analyzer 12. The network looping detecting apparatus according to the fourth embodiment will be described below based on the system arrangement shown in FIGS. 2 and 3.

The data analyzer 12 of the network looping detecting apparatus 10 according to the fourth embodiment has device adjacency information indicative of how monitored devices are connected.

FIG. 13 shows an example of device adjacency information in FIG. 3.

As shown in FIG. 13, the device adjacency information, denoted by 51, contains stored adjacent monitored addresses of each of the monitored devices 31 through 35. For example, as shown in FIG. 3, the monitored device 31 is connected adjacent to the monitored device 32. Therefore, the device adjacency information 51 contains the monitored address R2 stored in association with the monitored address R1. Furthermore, as shown in FIG. 3, the monitored device 32 is connected adjacent to the monitored devices 31, 33, 34. Therefore, the device adjacency information 51 contains the monitored addresses R1, R3, R4 stored in association with the monitored address R2. The device adjacency information 51 is stored in a memory such as a RAM, for example.

A process of detecting network looping from device adjacency information will be described below with reference to FIG. 14.

Figure 14:
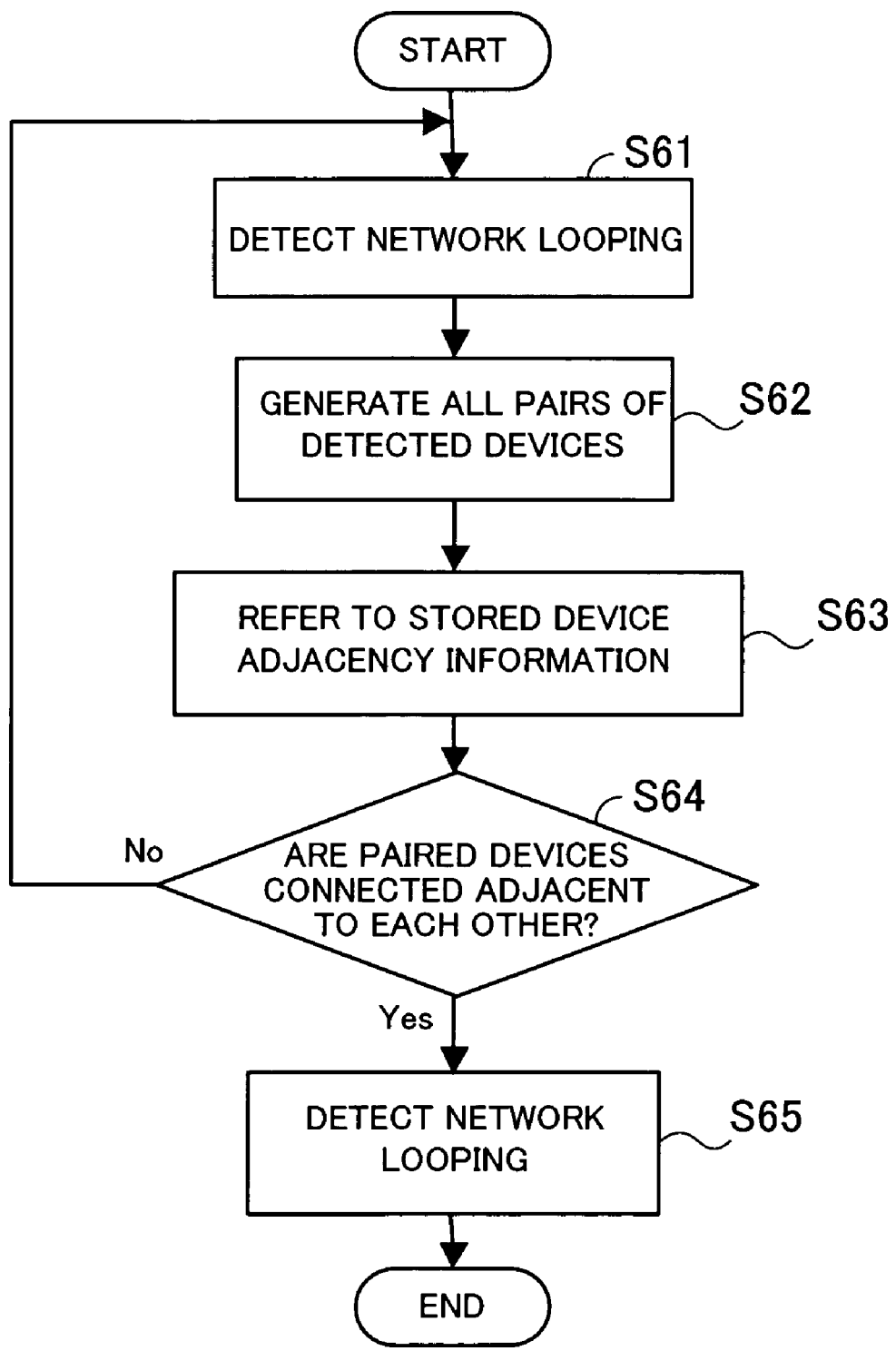
FIG. 14 is a flowchart of a processing sequence of a network looping detecting apparatus according to a fourth embodiment of the present invention.

FIG. 14 shows a processing sequence of the network looping detecting apparatus 10 according to the fourth embodiment of the present invention.

In step S61, the data analyzer 12 of the network looping detecting apparatus 10 detects network looping temporarily, but not finally. The data analyzer 12 may detect network looping according to one of the processes described above in the first through third embodiments, for example.

In step S62, the data analyzer 12 pairs the monitored addresses of the monitored devices which are involved in the detected network looping.

In step S63, the data analyzer 12 refers to the stored device adjacency information 51.

In step S64, the data analyzer 12 determines whether the monitored addresses in each pair are connected adjacent to each other or not, based on the device adjacency information 51. If the monitored addresses in each pair are connected adjacent to each other, then control goes to step S65. If the monitored addresses in each pair are not connected adjacent to each other, then control goes back to step S61.

In step S65, the data analyzer 12 finally detects network looping in the monitored network 21.

When the processing of step S65 is ended, the data analyzer 12 executes again the steps of the processing sequence from step S61.

As described above, when network looping is temporarily detected, monitored devices involved in the network looping are checked for their adjacency relationship. If the monitored devices involved in the network looping are connected adjacent to each other, then network looping is finally detected. In this manner, network looping can be detected more accurately.

A network looping detecting apparatus according to a fifth embodiment of the present invention will be described below.

According to the fifth embodiment, when network looping is detected, monitored devices involved in the detected network looping are determined as network looping devices.

The network looping detecting apparatus according to the fifth embodiment is of an arrangement similar to the network looping detecting apparatus 10 according to the first embodiment shown in FIG. 2, but differs therefrom as to the function of the data analyzer 12. The network looping detecting apparatus according to the fifth embodiment will be described below based on the system arrangement shown in FIGS. 2 and 3.

Figure 15:
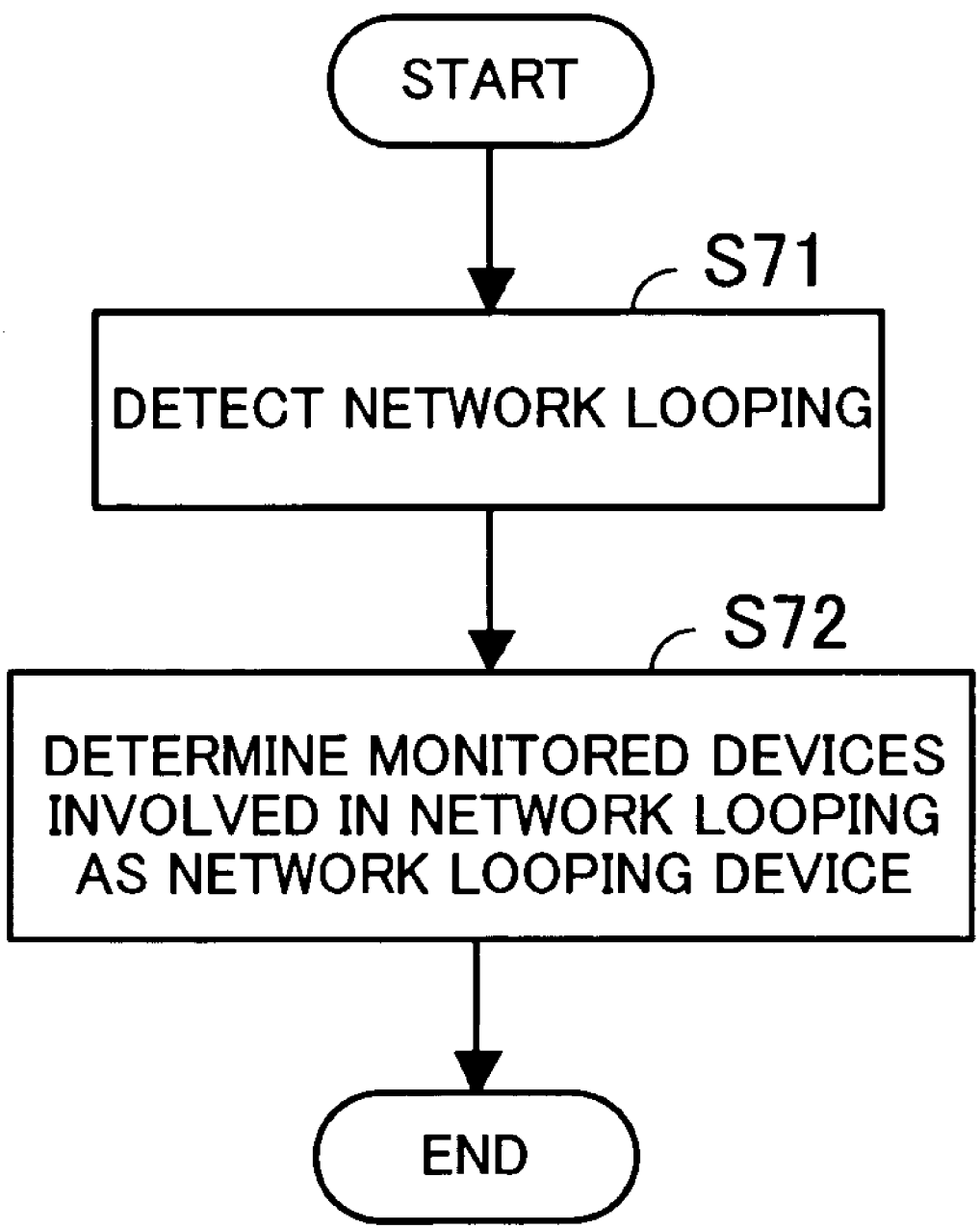
FIG. 15 is a flowchart of a processing sequence of a network looping detecting apparatus according to a fifth embodiment of the present invention.

FIG. 15 shows a processing sequence of the network looping detecting apparatus 10 according to the fifth embodiment of the present invention.

In step S71, the data analyzer 12 of the network looping detecting apparatus 10 detects network looping finally. The data analyzer 12 may detect network looping according to one of the processes described above in the first through fourth embodiments, for example.

In step S72, the data analyzer 12 determines a group of monitored devices involved in the detected network looping as network looping devices. Any monitored devices that are involved in network looping can be identified because their monitored addresses are acquired when the network looping is detected.

The network looping devices are displayed on the display unit of the network looping detecting apparatus 10, letting the administrator know which monitored devices are involved in the network looping.

As described above, since the network looping devices are determined, it is possible to identify the devices for eliminating network looping.

A network looping detecting apparatus according to a sixth embodiment of the present invention will be described below.

A count of icmpOutTimeExcds is given from each monitored device, not from each port of a monitored device. Therefore, if a monitored address is a port address (IP address), then counts of icmpOutTimeExcds may be returned from one device in response to access to different monitored addresses. According to the sixth embodiment, in order to prevent duplicated counts of icmpOutTimeExcds from being acquired from one device, the initial physical address information of ports (initial ifPhysAddress of ifEntry table) is used to specify port addresses as monitored addresses inherent in monitored devices.

The network looping detecting apparatus according to the sixth embodiment is of an arrangement similar to the network looping detecting apparatus 10 according to the first embodiment shown in FIG. 2, but differs therefrom as to the function of the data analyzer 12. The network looping detecting apparatus according to the sixth embodiment will be described below based on the system arrangement shown in FIGS. 2 and 3.

Figure 16:
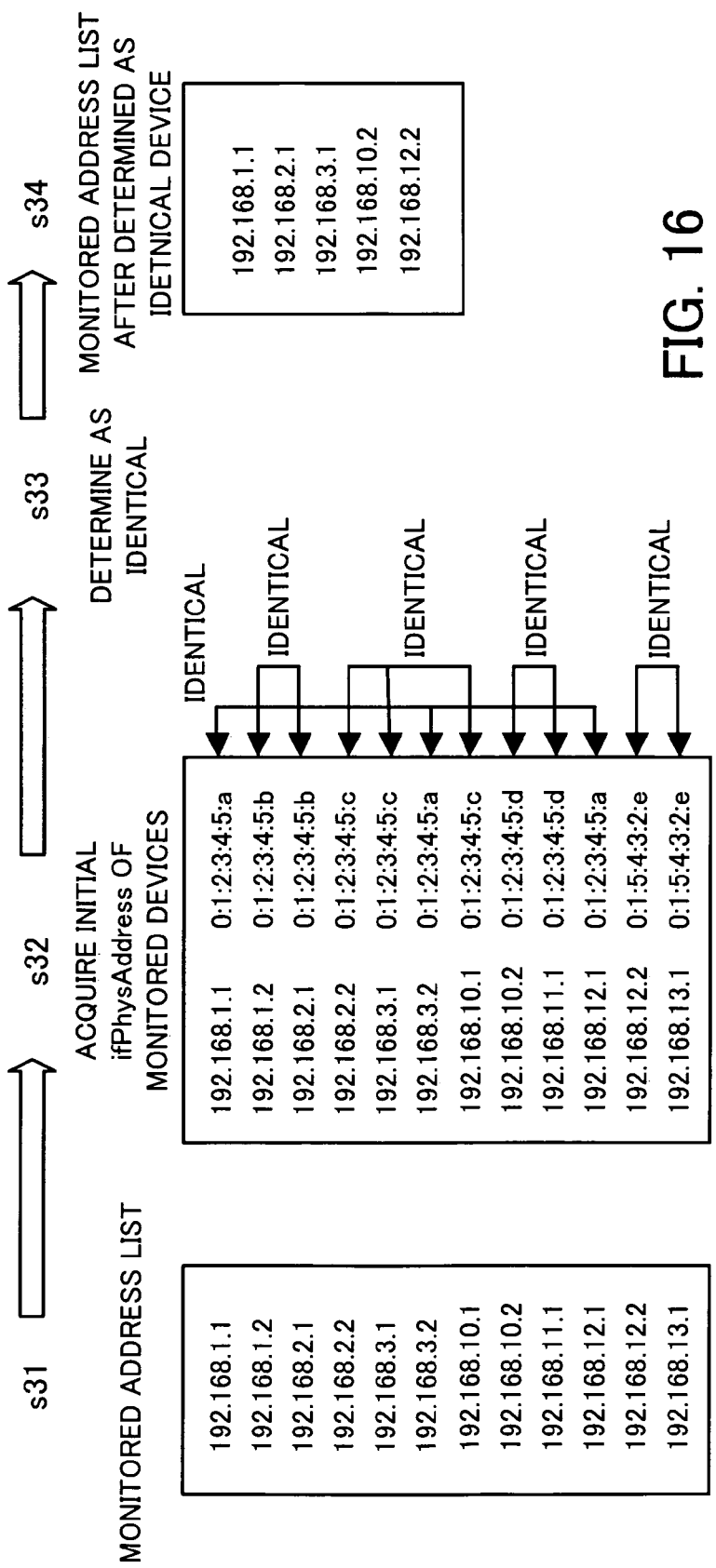
FIG. 16 is a diagram illustrative of an identical device determining process.

FIG. 16 is illustrative of an identical device determining process performed by the network looping detecting apparatus according to the sixth embodiment.

In FIG. 16, operation of the network looping detecting apparatus 10 shown in FIGS. 2 and 3 will be described separately in steps s31 through s34.

As indicated in step s31, the network looping detecting apparatus 10 acquires a monitored address list. The monitored address list contains IP addresses assigned to respective ports of monitored devices. The monitored address list shown in FIG. 16 contains the IP addresses shown in FIG. 3.

As indicated in step s32, the network looping detecting apparatus 10 acquires ifPhysAddress in MIB from the monitored devices. Specifically, the network looping detecting apparatus 10 acquires the initial information (ifPhysAddress) of physical addresses assigned to respective ports of the monitored devices.

As indicated in step s33, the network looping detecting apparatus 10 determines IP addresses having the same ifPhysAddress. For example, the network looping detecting apparatus 10 judges that the IP address 192.168.10.1, the IP address 192.168.2.2, and the IP address 192.168.3.1 have 0:1:2:3:4:5:c as common ifPhysAddress.

As indicated in step s34, the network looping detecting apparatus 10 selects one of the IP addresses having the same ifPhysAddress. For example, the network looping detecting apparatus 10 selects 192.168.3.1 from the IP address 192.168.10.1, the IP address 192.168.2.2, and the IP address 192.168.3.1.

Since ifPhysAddress is inherent in each monitored device, a selected one of the IP addresses having the same ifPhysAddress is regarded as the monitored address inherent in a monitored device.

The identical device determining process will be described below with reference to FIG. 17.

Figure 17:
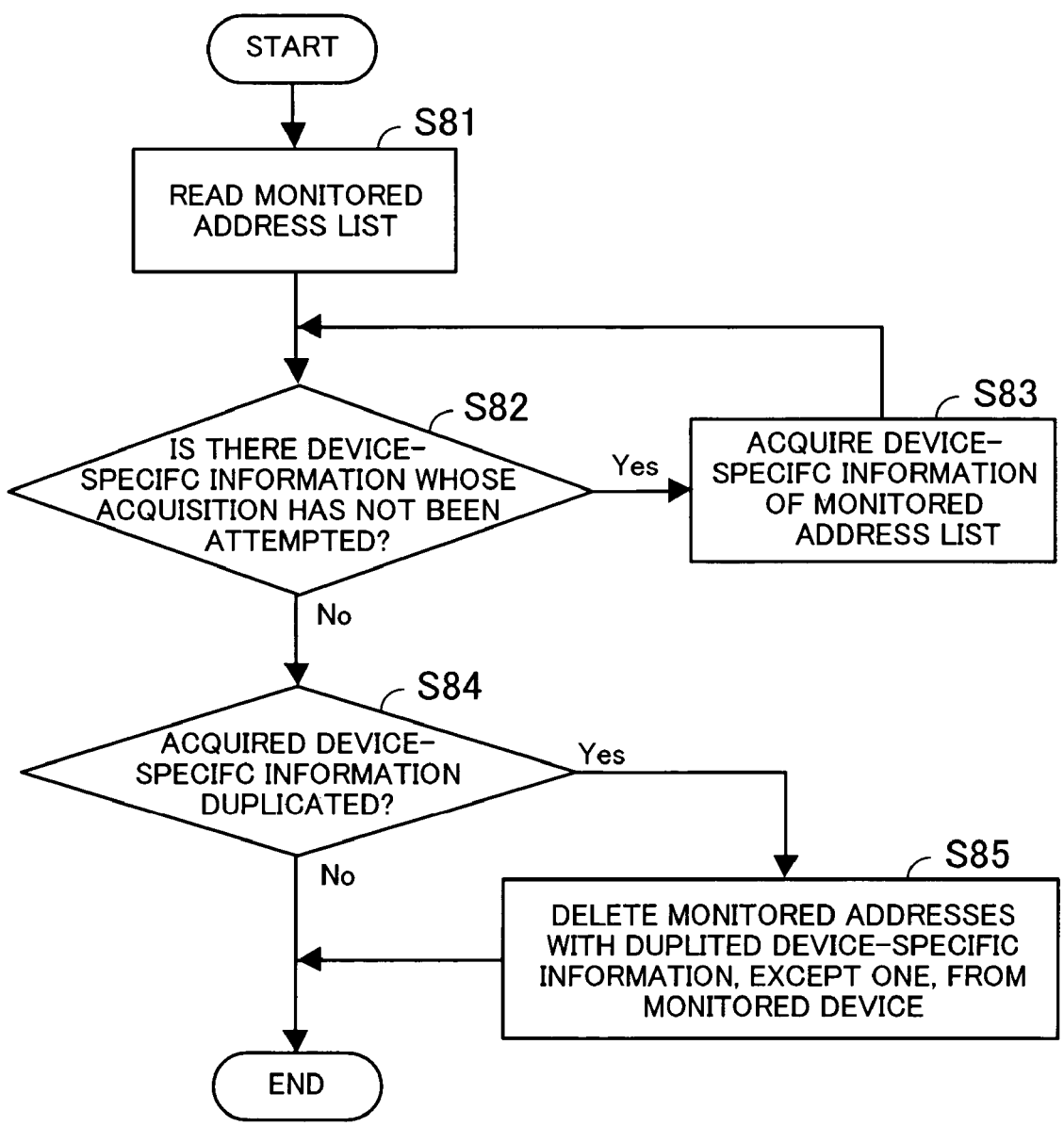
FIG. 17 is a flowchart of a processing sequence of a network looping detecting apparatus according to a sixth embodiment of the present invention.

FIG. 17 shows a processing sequence of the network looping detecting apparatus 10 according to the sixth embodiment of the present invention.

In step S81, the data acquiring unit 11 of the network looping detecting apparatus 10 reads a monitored address list of IP addresses.

In step S82, the data analyzer 12 determines whether there is device-specific information (ifPhysAddress), whose acquisition has not been attempted, corresponding to the monitored address list or not. If there is device-specific information, whose acquisition has not been attempted, corresponding to the monitored address list, then control goes to step S83. If there is not device-specific information, whose acquisition has not been attempted, corresponding to the monitored address list, then control goes to step S84.

In step S83, the data acquiring unit 11 acquires device-specific information corresponding to the monitored address list.

In step S84, the data analyzer 12 determines whether there is duplicated device-specific information that has been acquired or not. If there is duplicated device-specific information that has been acquired, then control goes to step S85. If there is not duplicated device-specific information that has been acquired, then the processing sequence shown in FIG. 17 is put to an end.

In step S85, the data analyzer 12 deletes all the monitored addresses, except one, whose device-specific information is duplicated, from the monitored devices.

As described above, a monitored address list of IP addresses is acquired from a monitored device, and device-specific information (ifPhysAddress) is acquired. If the device-specific information (ifPhysAddress) is duplicated, then only one of the monitored addresses corresponding to the duplicated device-specific information (ifPhysAddress) is selected. In this manner, the monitored address that remains on the monitored address list is regarded as the monitored address specific to the monitored device.

A seventh embodiment of the present invention will be described below.

According to the seventh embodiment, after monitored devices involved in network looping are specified, the network looping is confirmed by a packet capturing process.

Figure 18:
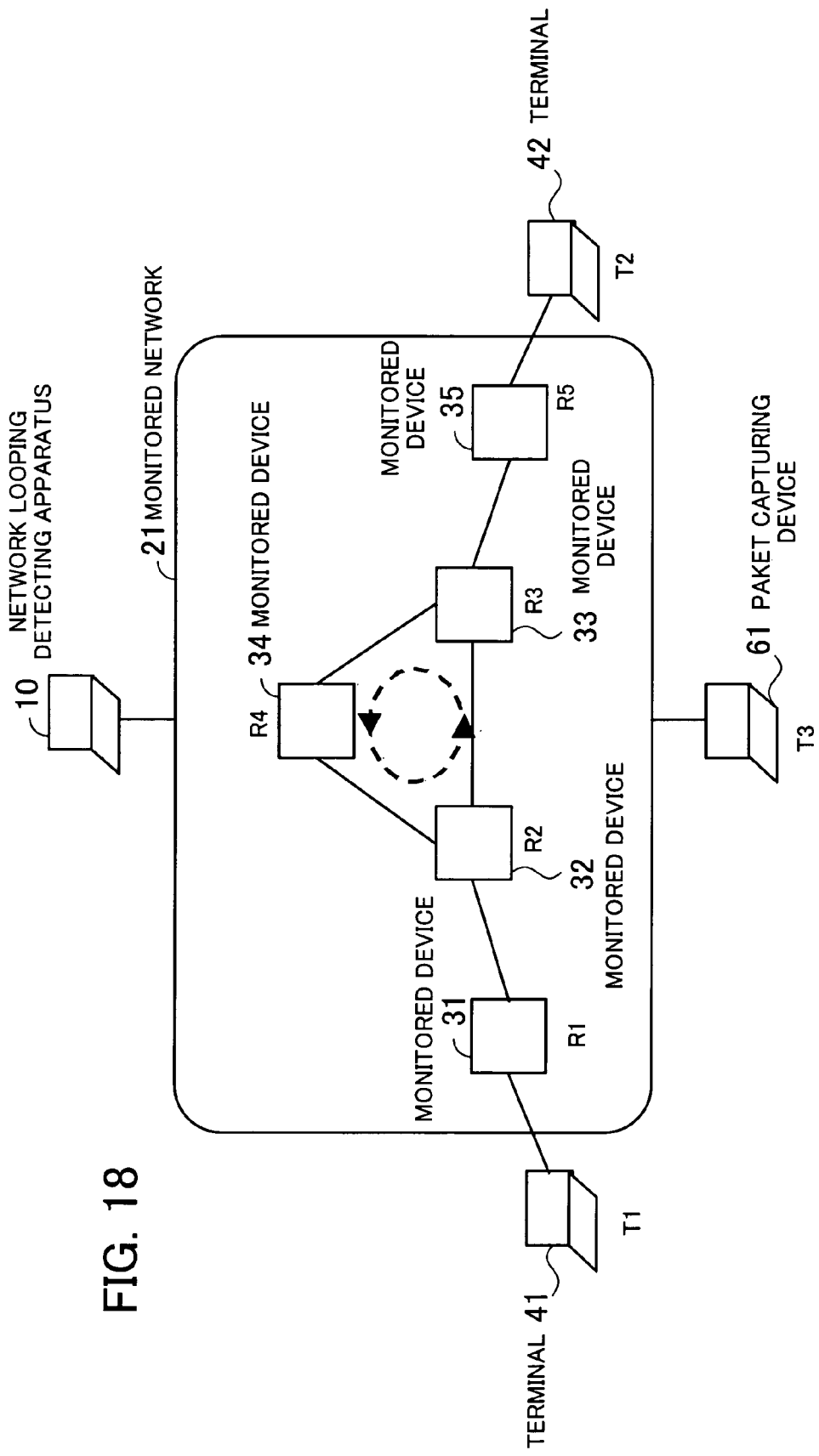
FIG. 18 is a block diagram illustrative of how network looping is detected according to a seventh embodiment of the present invention.

FIG. 18 is illustrative of how network looping is detected according to the seventh embodiment of the present invention.

Those parts shown in FIG. 18 which are identical to those shown in FIG. 3 are denoted by identical reference characters, and will not be described in detail below.

As shown in FIG. 18, a packet capturing device 61 detects network looping according to a packet capturing process disclosed in "Delayed Internet routing convergence," ACM SIGCOMM 2000, (Stockholm), Aug. 31, 2000. The packet capturing device 61 identifies looping packets based on invariable parts such as a destination IP address and a source IP address and variable parts such as a TTL field and a checksum field according to IPv4 and a HopLimit field according to IPv6, thereby detecting network looping. This packet capturing process is based on the fact that the invariable parts of a looping packet are not changed and the variable parts thereof are changed by a recalculation each time the packet passes through a network device.

The network looping detecting apparatus 10 detects network looping as described above in the first through fourth embodiments, and specifies monitored devices involved in network looping as described above in the fifth embodiment.

The packet capturing device 61 is installed in a network looping area so as to be able to capture packets within specified network looping. The packet capturing device 61 captures packets in the specified network looping to confirm an instance of network looping.

The packet capturing process will be described below with reference to FIG. 19.

Figure 19:
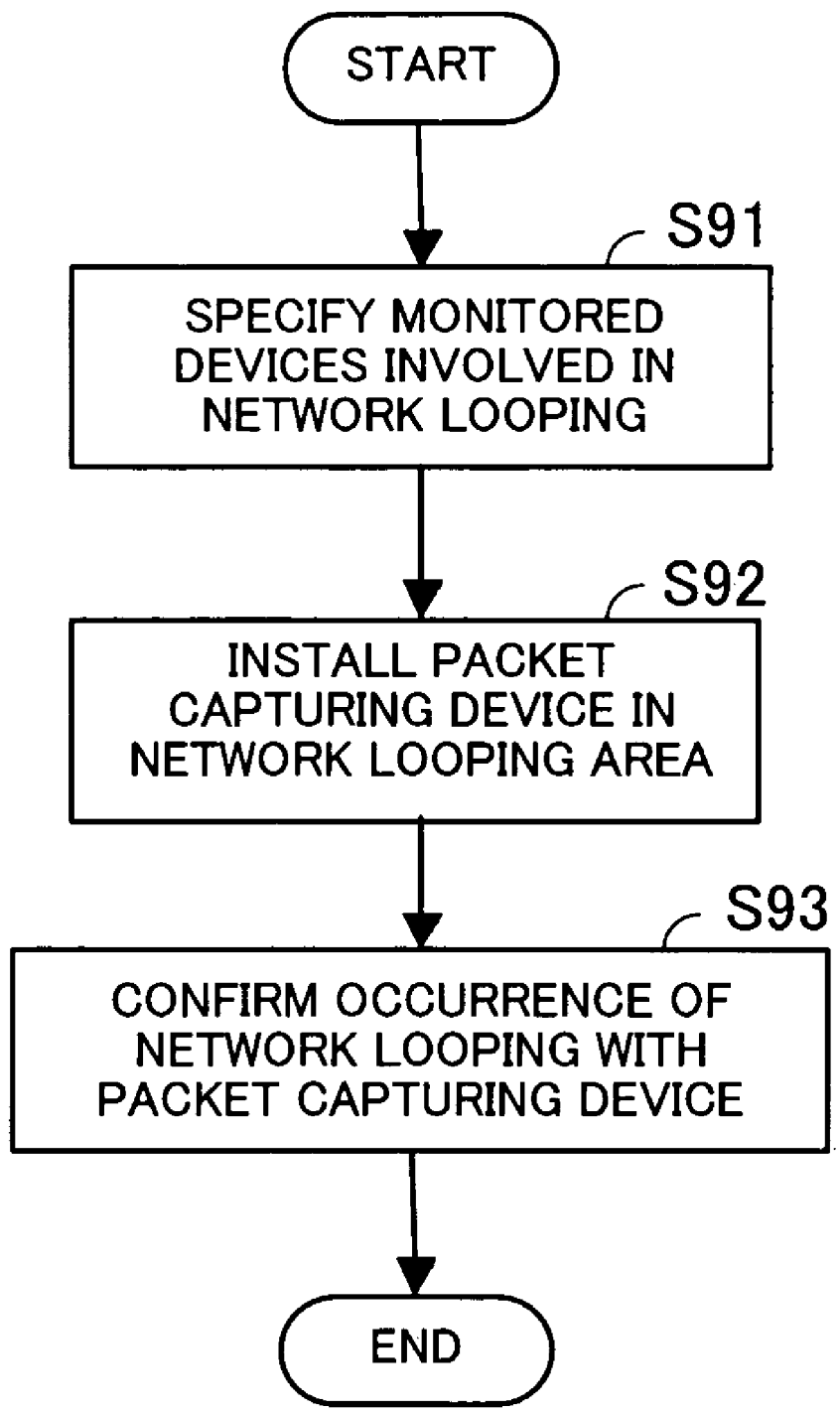
FIG. 19 is a flowchart of a processing sequence for detecting network looping according to the seventh embodiment.

FIG. 19 shows a processing sequence for detecting network looping according to the seventh embodiment.

In step S91, the network looping detecting apparatus 10 specifies monitored devices involved in network looping.

In step S92, the packet capturing device 61 is installed in a network looping area that is specified in step S91.

In step S93, the packet capturing device 61 captures packets in the network looping area to confirm the occurrence of network looping.

As described above, the packet capturing device 61 is not applied to the entire monitored network. Rather, a network looping area is specified, and then the packet capturing device 61 is installed in the specified network looping area. Therefore, the network looping detecting apparatus 10 has excellent scalability and can detect network looping more accurately.

An eighth embodiment of the present invention will be described below.

According to the eighth embodiment, after monitored devices involved in network looping are specified, the routing tables of the specified monitoring devices are individually checked to confirm network looping.

Figure 20:
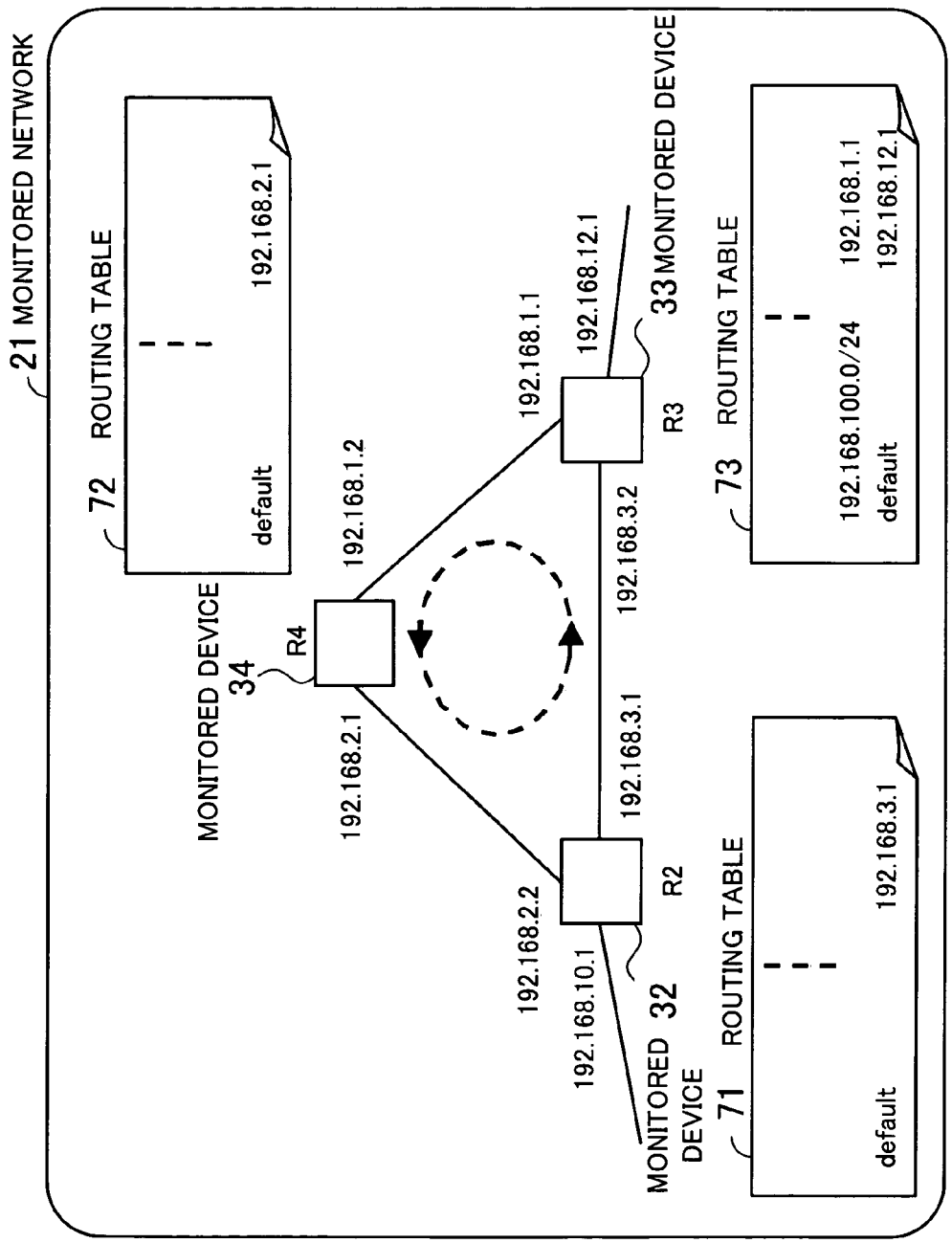
FIG. 20 is a block diagram illustrative of how network looping is detected according to an eighth embodiment of the present invention.

FIG. 20 is illustrative of how network looping is detected according to the eighth embodiment of the present invention.

Those parts shown in FIG. 20 which are identical to those shown in FIG. 3 are denoted by identical reference characters, and will not be described in detail below.

FIG. 20 shows routing tables 71, 72, 73 belonging to the monitored devices 32, 33, 34, respectively.

The network looping detecting apparatus 10 detects network looping as described above in the first through fourth embodiments, and specifies monitored devices involved in network looping as described above in the fifth embodiment.

The network looping detecting apparatus 10 accesses and acquires the routing tables of the monitored devices involved in specified network looping according to telnet or console log-in. The network looping detecting apparatus 10 then refers to the routing tables of the specified monitored devices to confirm network looping.

For example, it is assumed as shown in FIG. 20 that the monitored devices 32, 33, 34 are involved in network looping. The network looping detecting apparatus 10 refers to the routing tables of the monitored devices 32, 33, 34 to confirm that the monitored devices 32, 33, 34 are involved in network looping.

The process of referring to the routing tables will be described below with reference to FIG. 21.

Figure 21:
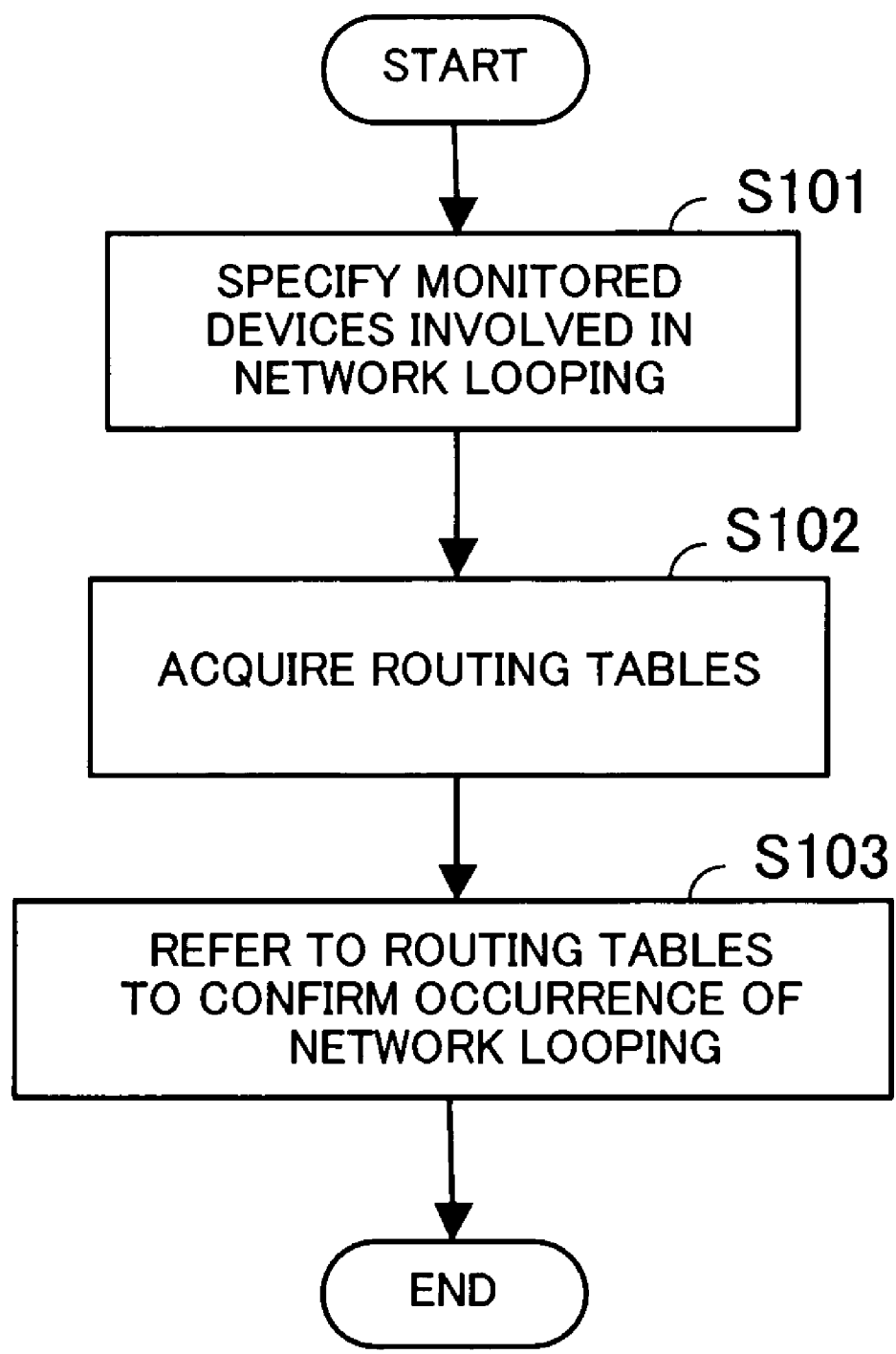
FIG. 21 is a flowchart of a processing sequence for detecting network looping according to the eighth embodiment.

FIG. 21 shows a processing sequence for detecting network looping according to the eighth embodiment.

In step S101, the network looping detecting apparatus 10 specifies monitored devices that are involved in network looping.

In step S102, the network looping detecting apparatus 10 acquires the routing tables of the monitored devices involved in the network looping.

In step S103, the network looping detecting apparatus 10 refers to the acquired routing tables to confirm the occurrence of network looping.

As described above, the network looping detecting apparatus 10 does not refer to all the routing tables of the monitored devices of the monitored network. Rather, network looping is specified, and the network looping detecting apparatus 10 refers to the routing tables of the monitored devices involved in the specified network looping. Therefore, the network looping detecting apparatus 10 has excellent scalability and can detect network looping more accurately.

According to the present invention, the network looping detecting apparatus detects network looping based on the fact that when a packet loops due to network looping, the lifetime of the packet elapses, and the count information of the network devices is counted up. Therefore, routing tables do not need to be referred to, and a packet capturing device for capturing packets to detect network looping does not need to be installed, so that the network looping detecting apparatus has improved real-time operation capability and scalability.

The foregoing is considered as illustrative only of the principles of the present invention. Further, since numerous modification and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A network looping detecting apparatus for detecting network looping, the network looping detecting apparatus comprising:
 a count information acquiring unit to acquire, once in each acquisition period, count information which is counted up when a lifetime of a packet has elapsed from each network device in a network to be monitored for network looping; and
 a looping detecting unit to calculate, for each network device, a difference between count information acquired at each of two consecutive acquisition periods, to select a pair of network devices the calculated differences of which are equal to or greater than a first threshold, to calculate a correlation value between said pair of network devices in terms of said differences, and to detect network looping between said pair of network devices if the correlation value is greater than or equal to a second threshold.

2. The network looping detecting apparatus according to claim 1, further comprising:

a memory to store device adjacency information representing adjacency relationship between network devices;

wherein said looping detecting unit refers to said device adjacency information and determines whether said pair of network devices are connected adjacent to each other or not for detecting network looping.

3. The network looping detecting apparatus according to claim 1, wherein said looping detecting unit specifies said network devices involved in the network looping.

4. The network looping detecting apparatus according to claim 3, further comprising:

a packet capturing unit to capture a packet in the network looping involving said network devices and confirming the network looping from invariable and variable parts of said packet.

5. The network looping detecting apparatus according to claim 3, wherein said looping detecting unit acquires a routing table from the specified network device and confirms the network looping from said routing table.

6. The network looping detecting apparatus according to claim 1, wherein said count information acquiring unit selects one of a plurality of IP addresses assigned to said network device, and accesses the selected IP address to acquire said count information.

7. The network looping detecting apparatus according to claim 1, wherein said count information comprises icmpOutTimeExcds in MIB.

8. A method of detecting network looping, the method comprising:

acquiring, once in each acquisition period, count information which is counted up when a lifetime of a packet has elapsed from each network device in a network to be monitored for network looping;

calculating, for each network device, a difference between said count information acquired at each of two consecutive acquisition periods;

selecting a pair of network devices whose calculated differences are equal to or greater than a first threshold;

calculating a correlation value between said pair of network devices in terms of said differences; and detecting network looping between said pair of network devices if the correlation value is greater than or equal to a second threshold.

\* \* \* \* \*